US010206535B2

(12) United States Patent
Gordon et al.

(10) Patent No.: US 10,206,535 B2
(45) Date of Patent: Feb. 19, 2019

(54) METHOD OF PREPARING A BEVERAGE WITH MIXING CHAMBER

(71) Applicant: Bedford Systems LLC, Bedford, MA (US)

(72) Inventors: Jeremy B. Gordon, Boston, MA (US); Charles Evan O'Neill, Tewksbury, MA (US); Miles Hember, Cambridge (GB); Trevor Beckett, Cambridge (GB); Thomas Paul Dutremble, Boston, MA (US); Gwynn Masada, Portola Valley, CA (US)

(73) Assignee: BEDFORD SYSTEMS LLC, Bedford, MA (US)

( * ) Notice: Subject to any disclaimer, the term of this patent is extended or adjusted under 35 U.S.C. 154(b) by 0 days.

(21) Appl. No.: 16/040,426

(22) Filed: Jul. 19, 2018

(65) Prior Publication Data
US 2018/0325302 A1    Nov. 15, 2018

Related U.S. Application Data

(62) Division of application No. 14/887,387, filed on Oct. 20, 2015, now Pat. No. 10,051,988.

(60) Provisional application No. 62/065,948, filed on Oct. 20, 2014.

(51) Int. Cl.
*A47J 31/40* (2006.01)
*B01F 3/04* (2006.01)
*A47J 31/46* (2006.01)

(52) U.S. Cl.
CPC ............. *A47J 31/407* (2013.01); *A47J 31/46* (2013.01); *B01F 3/04787* (2013.01)

(58) Field of Classification Search
CPC ...... A47J 31/407; A47J 31/46; B01F 3/04787
See application file for complete search history.

(56) References Cited

U.S. PATENT DOCUMENTS 9,259,120 B2 *   2/2016   Kodden ............... A47J 31/3623
10,051,988 B2 *  8/2018   Gordon ................. A47J 31/407

\* cited by examiner

*Primary Examiner* — Anthony J Weier
(74) *Attorney, Agent, or Firm* — Dorsey & Whitney LLP

(57) ABSTRACT

A beverage making machine may employ a mixing chamber to mix a beverage medium with a precursor liquid, such as carbonated water. The mixing chamber may have a precursor liquid inlet coupled to a precursor liquid supply, a beverage medium chamber to receive a beverage medium into the beverage medium chamber, and a dispense outlet from which beverage medium and precursor liquid are dispensed, e.g., into a user's cup. The beverage medium chamber may include a chamber inlet coupled to the precursor liquid inlet, e.g., so precursor liquid can enter the chamber when a pressure is low in the beverage medium chamber, and a chamber outlet downstream of the chamber inlet that is coupled to the dispense outlet, e.g., so that beverage medium can exit the chamber.

20 Claims, 17 Drawing Sheets

METHOD OF PREPARING A BEVERAGE WITH MIXING CHAMBER

CROSS REFERENCE TO RELATED APPLICATION

This application is a divisional of U.S. patent application Ser. No. 14/887,387, filed Oct. 20, 2015, now issued as U.S. Pat. No. 10,051,988, which claims priority to U.S. Provisional Application No. 62/065,948, filed Oct. 20, 2014, the disclosures of which are hereby incorporated, in their entireties, by this reference.

BACKGROUND

The inventions described herein relate to dissolving gas in liquids, e.g., carbonation, for use in preparing a beverage. Systems for carbonating liquids and/or mixing liquids with a beverage medium to form a beverage are described in a wide variety of publications, including U.S. Pat. Nos. 4,025,655, 4,040,342; 4,636,337; 6,712,342 and 5,182,084; and PCT Publication WO 2008/124851.

SUMMARY OF INVENTION

Aspects of the invention relate to carbonating or otherwise using a precursor liquid, such as water, to form a beverage. In some embodiments, a carbon dioxide or other gas source can be provided in a cartridge which is used to generate carbon dioxide or other gas that is dissolved into the precursor liquid. A beverage medium, such as a powdered drink mix or liquid syrup, may be provided in the same, or a separate cartridge as the gas source and mixed with the precursor liquid (either before or after carbonation) to form a beverage. The use of one or more cartridges for the gas source and/or beverage medium may make for an easy to use and mess-free system for making carbonated or other sparkling beverages, e.g., in the consumer's home. A beverage medium included in a cartridge may include any suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutriceuticals, etc.), powdered or liquid milk or other creamers, sweeteners, thickeners, and so on. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium or otherwise combining with the beverage medium.) (The term "carbonation" or "carbonated" is used herein to generically refer to beverages that have a dissolved gas, and thus refers to a sparkling beverage whether the dissolved gas is carbon dioxide, nitrogen, oxygen, air or other gas. Thus, aspects of the invention are not limited to forming beverages that have a dissolved carbon dioxide content, but rather may include any dissolved gas.)

In one aspect of the invention, a beverage making machine includes a precursor liquid supply to provide precursor liquid used to form a beverage, and a cartridge holder arranged to receive and hold a cartridge containing a beverage medium used to form a beverage with the precursor liquid. A dispensing station may include a mixing chamber having a precursor liquid inlet fluidically coupled to the precursor liquid supply, a beverage medium chamber fluidically coupled to the cartridge to receive beverage medium into the beverage medium chamber, and a dispense outlet from which beverage medium and precursor liquid are dispensed, e.g., into a user's cup. The beverage medium chamber may include a chamber inlet fluidically coupled to the precursor liquid inlet, e.g., so precursor liquid can enter the chamber, and a chamber outlet downstream of the chamber inlet and fluidically coupled to the dispense outlet, e.g., so that beverage medium can exit the chamber. The mixing chamber may be arranged such that, with precursor liquid flowing from the precursor liquid inlet to the dispense outlet, pressurized beverage medium in the beverage medium chamber flows through the chamber outlet to the dispense outlet. Flow of precursor liquid into the beverage medium chamber via the chamber inlet is prevented, however, by pressure in the beverage medium chamber. But, with precursor liquid flowing from the precursor liquid inlet to the dispense outlet, precursor liquid flows into the beverage medium chamber via the chamber inlet in the absence of pressurized beverage medium in the beverage medium chamber. Such flow can allow the precursor liquid to rinse the beverage medium chamber, e.g., so that a flavor of the beverage medium is not transferred to a subsequently made beverage.

In some embodiments, the precursor liquid inlet and the dispense outlet are connected by a 90 degree elbow, the chamber inlet is positioned at an upstream end of the 90 degree elbow, and the chamber outlet is positioned at a downstream end of the 90 degree elbow. For example, the chamber inlet and chamber outlet may be positioned at a radially outer wall of a 90 degree elbow. In some cases, the chamber inlet may be oriented in a horizontal direction and the chamber outlet may be arranged in a vertical direction. The chamber outlet may include a plurality of channels that lead downwardly from the beverage medium chamber, e.g., so that beverage medium flows from the chamber in multiple streams that encourage mixing with the precursor liquid. For example, the beverage medium chamber may be arranged to receive beverage medium that flows in a downward direction from the cartridge, the chamber inlet may be arranged to receive precursor liquid in a horizontal direction into the beverage medium chamber, and the chamber outlet may be arranged to conduct flow of beverage medium downwardly to the dispense outlet. In some embodiments, the mixing chamber may include an annular rim arranged to engage with a cartridge outlet to cause the outlet to open, e.g., the cartridge may be pressed into engagement with the annular rim, which causes a membrane or other feature of the cartridge to open and allow for the flow of beverage medium.

While the beverage making machine may include a variety of different components, in some embodiments the precursor liquid supply includes a carbonation tank having an inlet to receive precursor liquid, and an outlet to deliver precursor liquid from the carbonation tank to the dispensing station. A carbonating gas supply may be fluidly coupled to the carbonation tank to deliver carbon dioxide gas to the carbonation tank to carbonate the precursor liquid. For example, the cartridge holder may be arranged to provide carbon dioxide gas from a gas source in the cartridge to the carbonating gas supply line. In some cases, the precursor liquid supply may be arranged to deliver precursor liquid to the gas source in the cartridge to cause the gas source to release carbon dioxide, e.g., where the gas source is activated by water or other liquid. The cartridge holder may also be arranged to deliver pressurized gas to the cartridge to force beverage medium in the cartridge to flow into the beverage medium chamber under pressure. This pressurized flow may help control flow of precursor liquid into the beverage medium chamber of the mixing chamber.

In another aspect of the invention, a method for forming a beverage includes providing a beverage medium under pressure to a beverage medium chamber of a mixing chamber, causing flow of a precursor liquid from a precursor liquid inlet of the mixing chamber to a dispense outlet of the mixing chamber, and causing flow of beverage medium under pressure from the beverage medium chamber to the dispense outlet via a chamber outlet while preventing flow of precursor liquid into the beverage medium chamber via a chamber inlet. The beverage medium may mix with the precursor liquid, thereby dispensing beverage medium and precursor liquid from the dispense outlet. A pressure in the beverage medium chamber may be reduced, e.g., when the cartridge is empty of beverage medium, to permit flow of precursor liquid into the beverage medium chamber via the chamber inlet. Precursor liquid that flows into the beverage medium chamber via the chamber inlet may be allowed to exit the beverage medium chamber via the chamber outlet. In this way, the precursor liquid may rinse the beverage medium chamber. Mixing chamber and other machine configurations discussed above may be employed with the method, e.g., the precursor liquid inlet and the dispense outlet may be connected by a 90 degree elbow, the chamber inlet may be positioned at an upstream end of the 90 degree elbow, and the chamber outlet may be positioned at a downstream end of the 90 degree elbow.

In one embodiment, a carbonated and flavored beverage may be made over a period of time less than about 120 seconds (e.g., about 60 seconds) and using a gas pressure of 20-80 psi (e.g., above ambient) to form a carbonated liquid having a volume of between 100-1000 ml (e.g., about 500 ml) and a carbonation level of about 2 to 4 volumes (or less or more, such as 1 to 5 volumes). Thus, systems and methods according to this aspect may produce a relatively highly carbonated beverage in a relatively short period of time, and without requiring high pressures.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

Figure 1:
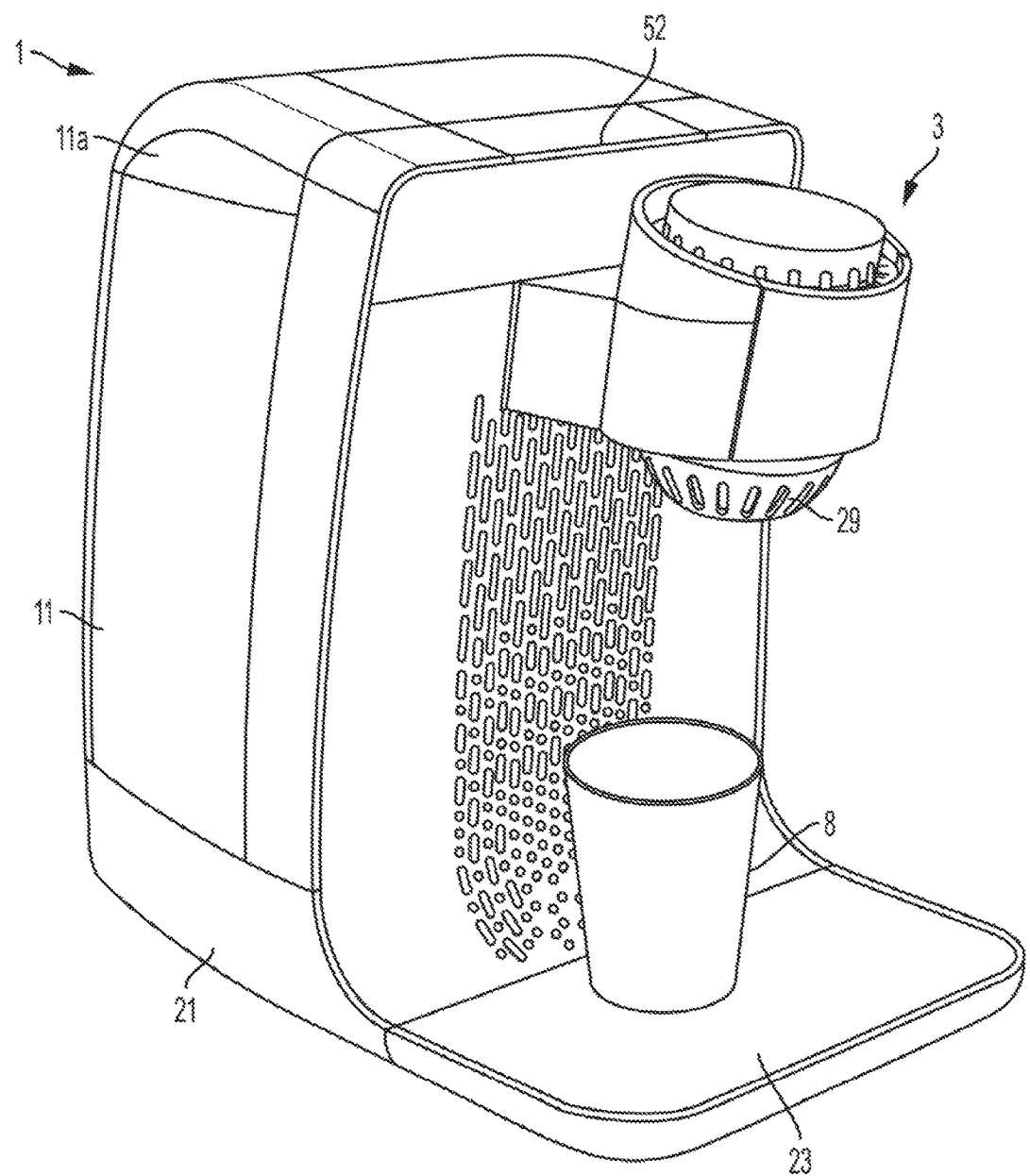
FIG. 1 shows a perspective view of an illustrative embodiment of a beverage making system having a removable reservoir.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In accordance with one aspect of the invention, a fluid (such as water, water vapor, or other) may be provided to a carbon dioxide or other gas source in a cartridge so as to cause the gas source to emit gas that is used to carbonate or otherwise for dissolution in a liquid. In one embodiment, a beverage making machine may include a gas activating fluid supply arranged to provide fluid to a cartridge chamber for contact with the gas source so as to cause the gas source to emit gas. In other arrangements, the gas source may be caused to release gas in other ways, such as by heating, exposing the source to microwaves or other electromagnetic radiation, etc. A gas supply of the machine may be arranged to conduct gas emitted by the gas source, under pressure greater than the ambient pressure, to a precursor liquid to carbonate the precursor liquid. In some embodiments, the gas source may be in solid form, such as a zeolite, activated carbon or other molecular sieve that is charged with carbon dioxide or other gas, and the use of a cartridge may not only isolate the gas source from activating agents (such as water vapor in the case of a charged zeolite), but also potentially eliminate the need for a user to touch or otherwise directly handle the carbon dioxide source.

Having a gas activating fluid supply may enable the use of another aspect of the invention, i.e., a volume or other measure of the fluid provided to the cartridge may be controlled to control the rate or amount of gas that produced by the gas source. This feature can make the use of some gas sources, such as a charged zeolite material, possible without requiring gas storage or high pressure components, although high pressure gas cylinders can be used as a gas source with some embodiments. For example, zeolites charged with carbon dioxide tend to release carbon dioxide very rapidly and in relatively large quantities (e.g., a 30 gram mass of charged zeolite can easily produce 1-2 liters of carbon dioxide gas at atmospheric pressure in a few seconds in the presence of less than 30-50 ml of water). This rapid release can in some circumstances make the use of zeolites impractical for producing relatively highly carbonated liquids, such as a carbonated water that is carbonated to a level of 2 volumes or more. (A carbonation "volume" refers to the number of volume measures of carbon dioxide gas that is dissolved in a given volume measure of liquid. For example, a 1 liter amount of "2 volume" carbonated water includes a 1 liter volume of water that has 2 liters of carbon dioxide gas dissolved in it. Similarly, a 1 liter amount of "4 volume" carbonated water includes a 1 liter volume of water that has 4 liters of carbon dioxide dissolved in it. The gas volume measure is the gas volume that could be released from the carbonated liquid at atmospheric or ambient pressure and room temperature.) That is, dissolution of carbon dioxide or other gases in liquids typically takes a certain amount of time, and the rate of dissolution can only be increased a limited amount under less than extreme conditions, such as pressures within about 150 psi of ambient and temperatures within about +/-40 to 50 degrees C. of room temperature. By controlling the rate of carbon dioxide (or other gas) production for a carbon dioxide (or other gas) source, the total time over which the carbon dioxide (or other gas) source emits carbon dioxide (or other gas) can be extended, allowing time for the carbon dioxide (gas) to be dissolved without requiring relatively high pressures. For example, when employing one illustrative embodiment incorporating one or more aspects of the invention, the inventors have produced liquids having at least up to about 3.5 volume carbonation levels in less than 60 seconds, at pressures under about 80 psi, and at temperatures around 0 degrees Celsius. Of course, as discussed above and elsewhere herein, aspects of the invention are not limited to use with carbon dioxide, and instead any suitable gas may be dissolved in a liquid in accordance with all aspects of this disclosure.

In another aspect of the invention, a portion of a precursor liquid that is used to form a beverage may be used to activate the gas source. This feature may help simplify operation of a beverage making machine, e.g., by eliminating the need for special activation substances. As a result, a beverage making machine, or a method of forming a sparkling beverage, may be made less expensively and/or without special purpose ingredients. For example, in the case of a machine making carbonated water, all that is needed to activate the carbon dioxide source may be a portion of the water used to form the beverage. It should be understood, however, that other aspects of the invention need not require the use of a portion of precursor liquid to activate a carbon dioxide source, and instead may use any suitable activating agent, such as a citric acid in aqueous form that is added to a bicarbonate material, heat, microwave or other electromagnetic radiation used to activate a zeolite source, and others. For example, the cartridge that includes the carbon dioxide source may include (as part of the source), an activating agent whose addition to another component of the carbon dioxide source is controlled to control carbon dioxide production.

FIGS. 1-4 show an illustrative embodiment of a beverage making system 1 that incorporates one or more aspects of the invention. In this embodiment, components of the beverage making system 1 are located in or on a housing 21 which includes a drip tray 23 to support a user's cup or other container 8 and a reservoir 11. In this case, the reservoir 11 is optionally removable from the housing 21 and contains beverage precursor liquid, such as water, that is used to form a beverage dispensed at a dispensing station 29 into the user's container 8. The reservoir 11 includes a removable lid 11a that can be removed to provide precursor liquid 2 into the reservoir 11, but such a lid 11a is not required. Moreover, the reservoir 11 need not be removable and/or may be replaced by a plumbed connection to a mains water source. The beverage precursor liquid 2 can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply which provides the precursor liquid 2 for conditioning of some kind, e.g., carbonation, filtering, chilling, mixing with a beverage medium, etc., and subsequent dispensing as a beverage.

Figure 4:
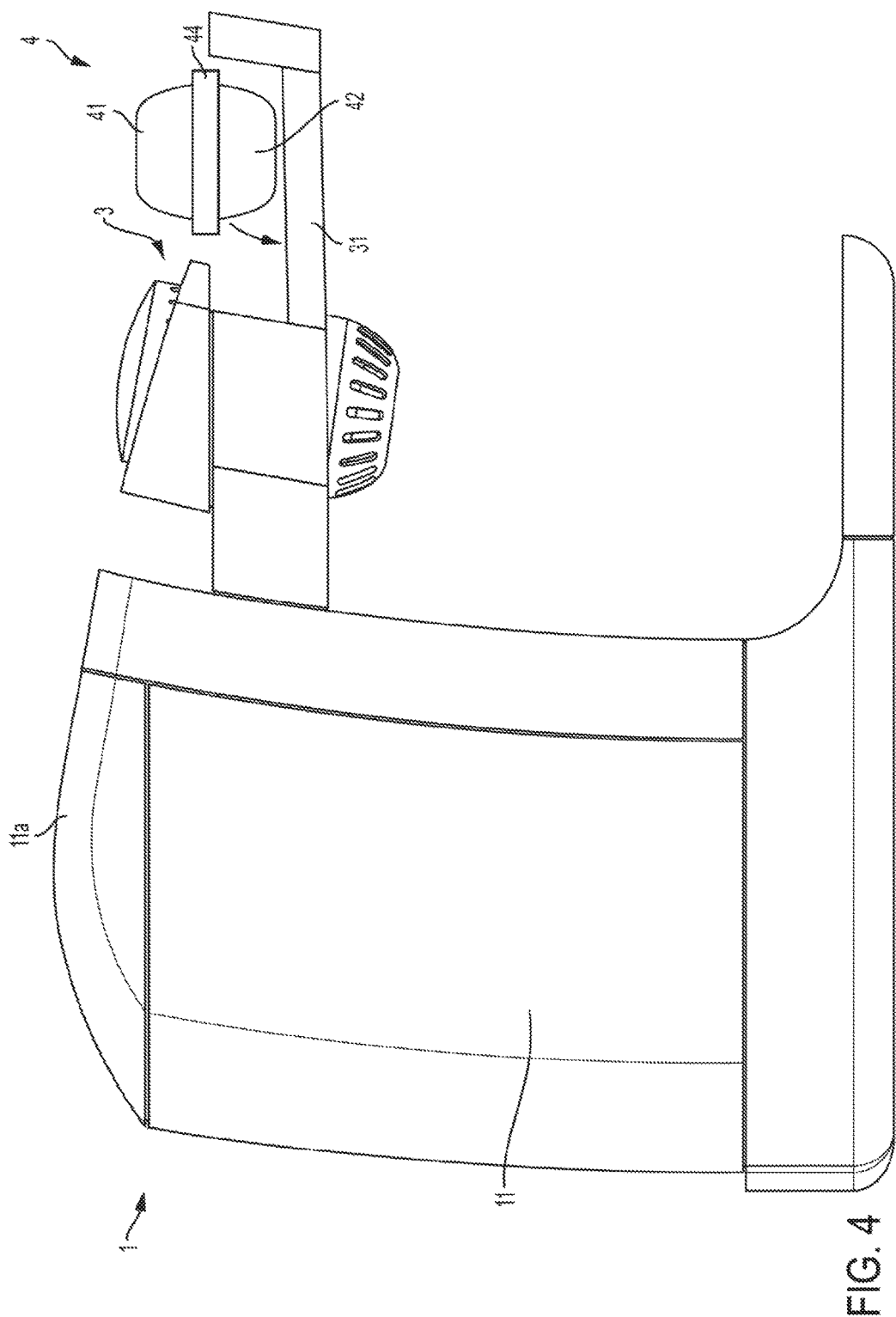
FIG. 4 shows a left side view of the beverage making system of FIG. 1 and a cartridge is located in a cartridge holder.

As can be seen in FIG. 4, a cartridge 4 containing a gas source and/or a beverage medium may be associated with a cartridge holder 3 of the system 1. The gas source may emit carbon dioxide or other gas which is used by the system 1 to carbonate the precursor liquid, and a beverage medium, such as a flavoring agent, may be mixed with precursor liquid. In this embodiment, the cartridge 4 may be associated with the cartridge holder 3 by pulling a sliding drawer 31 forwardly to expose a cartridge receiver or receiving area of the drawer 31. The cartridge 4, which in this case includes an upper compartment or chamber 41 containing a gas source and a lower compartment or chamber 42 containing a beverage medium, may be placed in the cartridge receiving area of the drawer 31 and the drawer 31 closed by sliding to the left in FIG. 4. Thereafter, a user may interact with an interface 52, such as a touch screen, button or other device by which the user can cause the system 1 to make a beverage. In response, the cartridge 4 may be clamped at a rim or band 44 located between the upper and lower compartments 41, 42 by the cartridge holder 3 and the compartments 41, 42 accessed to form the beverage. As is discussed in more detail below, aspects of the invention relate to a cartridge holder's ability to hold the upper and lower compartments 41, 42 of the cartridge 4 in spaces having different pressures (e.g., the upper compartment 41 may be held in a more highly pressurized space to receive carbonating gas than the lower compartment 42) and/or the holder's ability to pierce an inlet of the lower compartment 42 at an underside of the rim or band 44 to access the beverage medium (e.g., by injecting pressurized air or other gas into the lower compartment 42, thereby forcing the beverage medium to exit the cartridge and be dispensed at the dispense station 29). Since the cartridge 4 may be replaceable, a user may exchange the cartridge 4 to make different beverages, such as carbonated water only, a carbonated and flavored beverage, a still and flavored beverage, etc.

Figure 5:
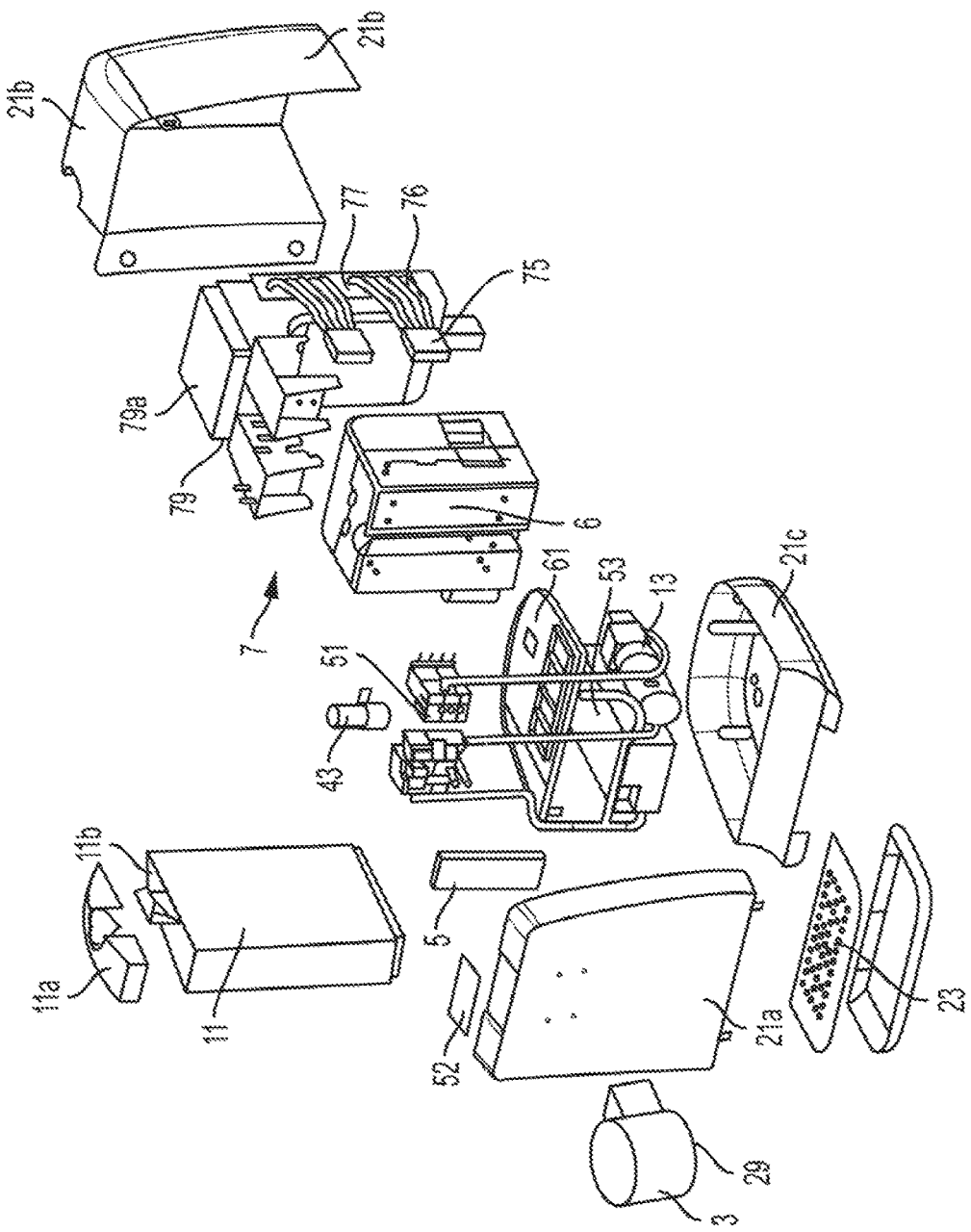
FIG. 5 shows an exploded view of the beverage making system of FIG. 1.

FIG. 5 shows an exploded view of the FIG. 1 embodiment including components that are located in the housing 21. In this embodiment, the housing 21 includes a front panel 21*a*, a back panel 21*b* and a base 21*c* that cooperate to house and/or support components of the system. Precursor liquid in the removable reservoir 11 is moved by a pump 13 via one or more control valves 51 to a carbonation tank 6 (supported on a support 61 over the pump 13) where the precursor liquid 2 is chilled by a cooling system 7 and carbonated. Thereafter, the precursor liquid is moved from the tank 6 to the dispense station 29 where the carbonated liquid may be mixed with a beverage medium in a cartridge 4 and dispensed. As mentioned above, beverage medium in the cartridge may be moved out of the cartridge by introducing pressurized gas into the cartridge 4, e.g., by an air pump 43 pumping air into the cartridge 4 and forcing the beverage medium to exit via an outlet of the cartridge. Control of the system may be performed by control circuitry 5, which may include a programmed general purpose computer and/or other data processing device along with suitable software or other operating instructions, one or more memories (including non-transient storage media that may store software and/or other operating instructions), a power supply 53 for the control circuitry 5 and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as the user interface 52 to display information to a user and/or receive input from a user), communication buses or other links, a display, switches, relays, triacs, motors, mechanical linkages and/or actuators, or other components necessary to perform desired input/output or other functions.

In accordance with an aspect of the invention, the cooling system 7 used to chill precursor liquid in the carbonation tank 6 may include one or more thermoelectric devices 75 thermally coupled to the carbonation tank 6, one or more heat pipes 76 having an evaporator section coupled to the thermoelectric devices 75, and one or more heat sinks 77 thermally coupled to the condenser section of the heat pipes 76. A cooling air flow may be moved through a duct 79 and across the heat sinks by a fan (not shown), another air mover, and/or in other ways, such as by convection. The use of a thermoelectric device/heat pipe/heat sink arrangement is not required for all embodiments, however, and other embodiments may include a conventional refrigeration system or other cooling system (such as that found in refrigerators, air conditioning units, or other devices used to remove heat from a material) to cool the liquid in the carbonation tank 6 or elsewhere in the system. In some arrangements, cooling the precursor liquid before entering or while in the carbonation tank 6 may help the carbonation process, e.g., because cooler liquids tend to dissolve carbon dioxide or other gas more rapidly and/or are capable of dissolving larger amounts of gas. However, carbonated liquid could be chilled after flowing from the carbonation tank, e.g., using a flow through device.

Figure 2:
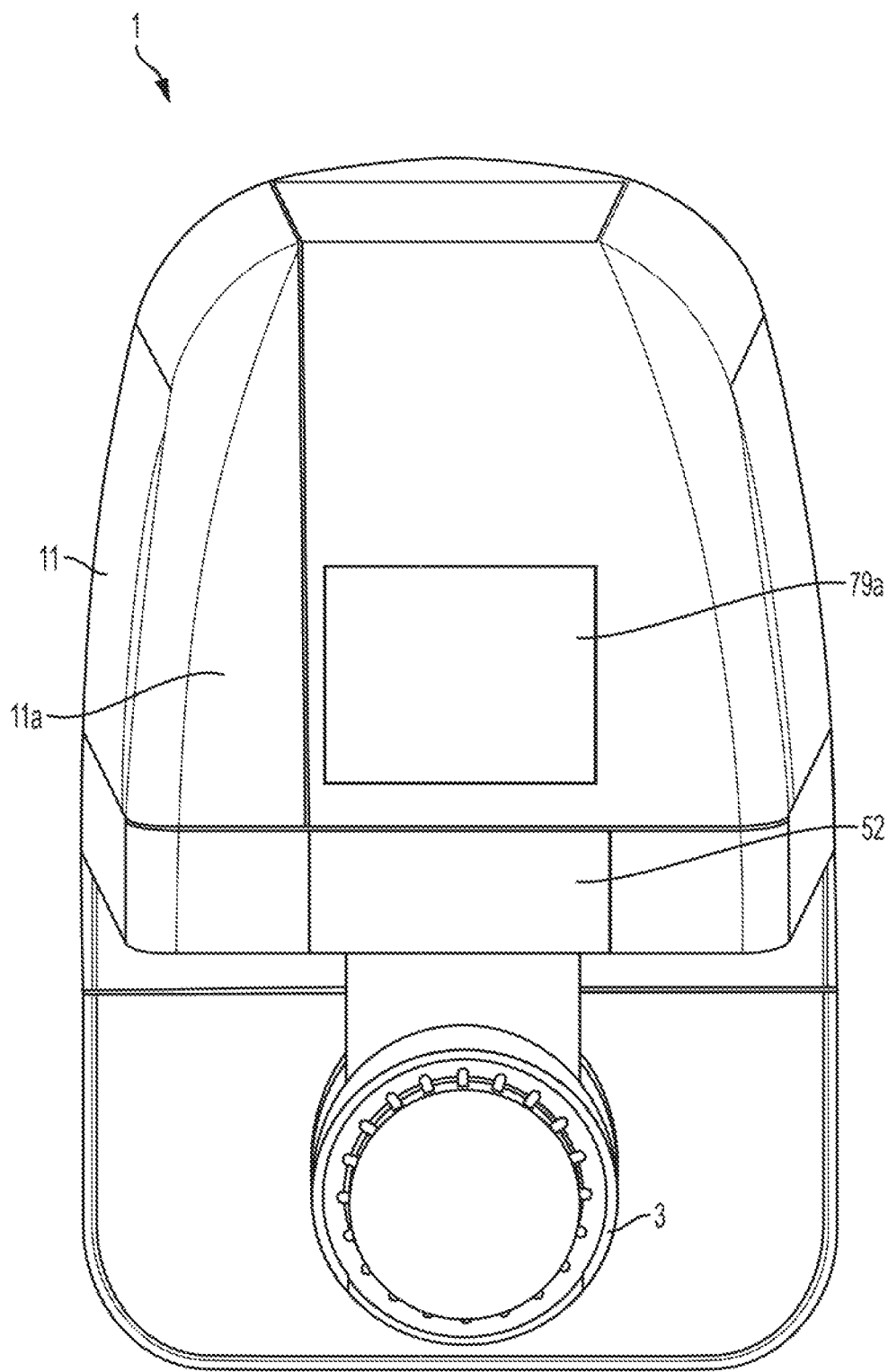
FIG. 2 shows a top view of the beverage making system of FIG. 1.
Figure 3:
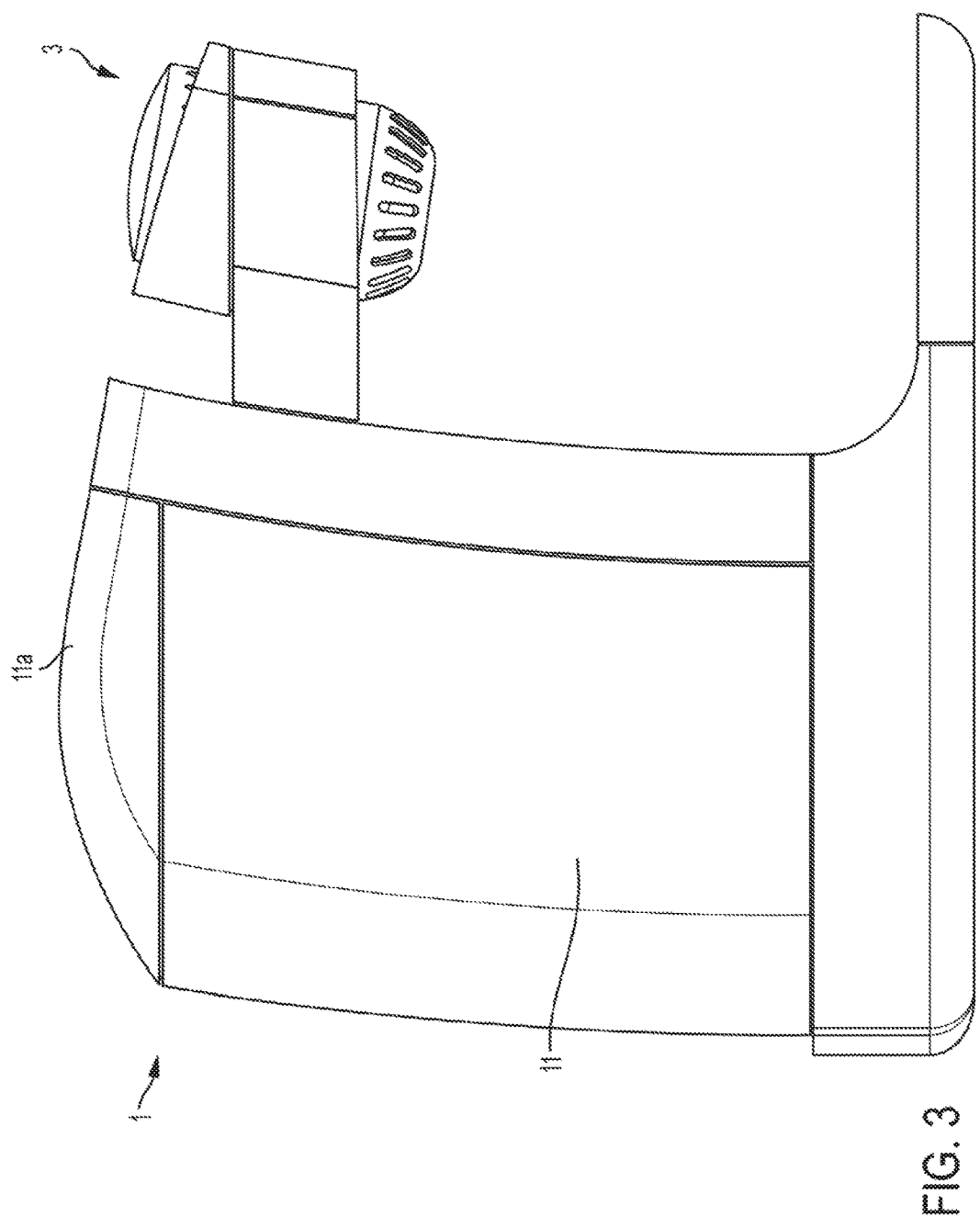
FIG. 3 shows a left side view of the beverage making system of FIG. 1.

In accordance with an aspect of the invention, an outlet of the duct for the cooling system may be positioned adjacent an inlet opening for providing precursor liquid to the system. In some embodiments, the duct may be arranged such that any precursor liquid that is unintentionally provided into the duct outlet may be routed by the duct and/or portions of the housing to a bottom of the housing, e.g., exiting via holes at a bottom of the housing. This may help prevent damage to electrical components because such components may be located outside of the duct and/or otherwise protected from contact with the precursor liquid in the duct. For example, as can be seen in FIG. 2, a duct outlet 79*a* may be positioned at a top of the housing 21 adjacent the reservoir lid 11*a*, which can be removed to expose an inlet opening 11*b* through which water may be provided into the reservoir 11. In the process of pouring water into the reservoir 11, it may be possible to spill some water into the duct outlet 79*a*. However, in this embodiment, any liquid spilled into the duct outlet 79*a* may be routed by the duct 79 and/or portions of the housing 21 to a bottom of the housing 21, e.g., to the base 21*c*. In some cases, the liquid may flow into the drip tray 23 and/or may exit from the base 21*c* through holes in the base 21*c*. The duct 79, which may extend from the outlet 79*a* to an inlet (not shown) near a bottom of the housing 21, may be isolated from all or most of any electrical components of the system 1 such that liquid entering the outlet 79*a* may flow downwardly to the bottom of the housing 21 without contact with electrical components. In this sense, the duct 79 may be isolated from electrical components of the system 1 such that liquid in the duct 79 does not contact the electrical components. This arrangement may help prevent damage to the system 1 if liquid accidentally enters the duct outlet 79*a*.

Figure 6:
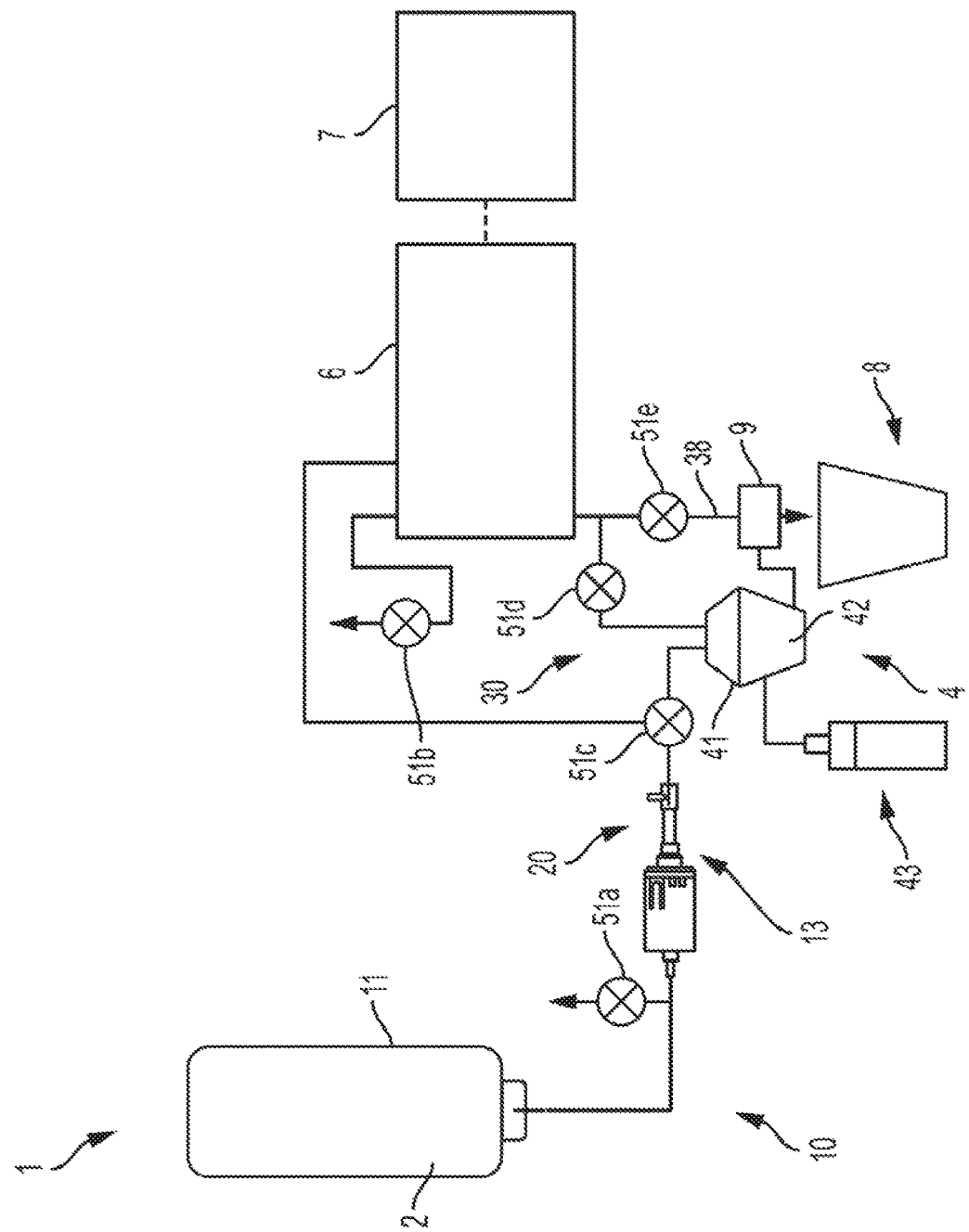
FIG. 6 shows a schematic diagram of an illustrative flow circuit in a beverage making system.

A beverage making system 1 may employ different liquid and gas flow path arrangements in accordance with aspects of the invention. FIG. 6 shows one such arrangement in an illustrative embodiment. In this embodiment, precursor liquid 2 provided by a precursor liquid supply 10 originates in the reservoir 11, which may be removable from the system 1, e.g., to allow for easier filling, or may be fixed in place. Although in this embodiment a user initially provides the beverage precursor liquid 2 in the reservoir 11, the precursor supply 10 may include other components to provide liquid 2 to the reservoir 11, such as a plumbed water line, controllable valve, and liquid level sensor to automatically fill the reservoir 11 to a desired level, a second water reservoir or other tank that is fluidly connected to the reservoir 11, and other arrangements. Liquid 2 is delivered by a pump 13 to the carbonation tank 6 via a three-way valve 51*c*. In this instance, the pump 13 is a solenoid pump, but other pump types are possible. The carbonation tank 6 may be suitably filled with liquid 2 using any suitable control method, such as by sensing a level in the tank 6 using a conductive probe, pressure sensor, optical sensor or other sensor. A tank vent valve 51*b* may be opened during filling to allow the pressure in the tank 6 to vent, or may remain closed during filling, e.g., to allow a pressure build up in the tank 6. Though not shown in FIG. 6, the control circuit 5 may control operation of the valves 51, e.g., the valves 51 may include electromechanical or other actuators, as well as include sensors to detect various characteristics, such as temperature in the tank 6, pressure in the tank 6, a flow rate of gas or liquid in any of the system flow lines, etc.

To form a beverage, a user may associate a cartridge 4 with the system 1, e.g., by loading the cartridge 4 into a cartridge holder 3 in a way like that discussed with respect to FIG. 4. Of course, a cartridge may be associated with the system 1 in other ways, such as by screwing a portion of the cartridge into engagement with the system 1, etc. With the cartridge 4 associated with the system 1, the control circuit 5 may then activate the system 1 to deliver liquid to the cartridge 4, e.g., to cause carbon dioxide to be generated. (Though this embodiment uses a cartridge with a gas source activated by a fluid, other arrangements are possible, including the use of a pressurized gas cylinder as a gas source.) The control circuit 5 may start operation of the system 1 in an automated way, e.g., based on detecting the presence of a cartridge 4 in the holder 3, detecting liquid 2 in the carbonation tank 6 and closure of the holder 3, and/or other characteristics of the system 1. Alternately, the control circuit 5 may start system operation in response to a user pressing a start button or otherwise providing input (e.g., by voice activation) to start beverage preparation.

To initiate carbonation, the vent valve 51b may be closed and the three-way valve 51c controlled to allow the pump 13 to pump liquid into the upper compartment 41 of a cartridge 4 that contains a gas source. That is, the system 1 may include a carbon dioxide activating fluid supply 20 that provides a fluid to a cartridge 4 so as to activate a carbon dioxide source in the upper compartment 41 to release carbon dioxide gas. In this embodiment, the carbon dioxide source includes a charged adsorbent or molecular sieve, e.g., a zeolite material that has adsorbed some amount of carbon dioxide gas that is released in the presence of water, whether in vapor or liquid form. Of course, other carbon dioxide source materials may be used, such as charcoal or other molecular sieve materials, carbon nanotubes, metal organic frameworks, covalent organic frameworks, porous polymers, or source materials that generate carbon dioxide by chemical means, such as sodium bicarbonate and citric acid (with the addition of water if the bicarbonate and acid are initially in dry form), or others. In addition, aspects of the invention are not necessarily limited to use with carbon dioxide gas, but may be used with any suitable gas, such as nitrogen, which is dissolved in some beers or other beverages, oxygen, air, and others. Thus, reference to "carbonation", "carbon dioxide source" "carbon dioxide activating fluid supply", etc., should not be interpreted as limiting aspects of the invention and/or any embodiments to use with carbon dioxide only. Instead, aspects of the invention may be used with any suitable gas.

In one embodiment, the charged adsorbent is a zeolite such as analcime, chabazite, clinoptilolite, heulandite, natrolite, phillipsite, or stilbite. The zeolite may be naturally occurring or synthetic, and may be capable of holding up to about 18% carbon dioxide by weight or more. The zeolite material may be arranged in any suitable form, such as a solid block (e.g., in disc form), particles of spherical, cubic, irregular or other suitable shape, and others. An arrangement that allows the zeolite to flow or be flowable, e.g., spherical particles, may be useful for packaging the zeolite in individual cartridges. Such an arrangement may allow the zeolite to flow from a hopper into a cartridge container, for example, simplifying the manufacturing process. The surface area of the zeolite particles may also be arranged to help control the rate at which the zeolite releases carbon dioxide gas, since higher surface area measures typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

The carbon dioxide activating fluid supply 20 in this embodiment includes a conduit that is fluidly coupled to the pump 13 and the valve 51c that can be controlled to open/close or otherwise control the flow of precursor liquid 2 into the cartridge 4. That is, and in accordance with an aspect of the invention, a single pump may be arranged to both deliver precursor liquid to the carbonation tank and deliver activating fluid to a gas source. Other arrangements or additions are possible for the carbon dioxide activating fluid supply 20, such as a dedicated liquid supply for the cartridge 4 that is separate from the precursor liquid supply, a pressure-reducing element in the conduit, a flow-restrictor in the conduit, a flow meter to indicate an amount and/or flow rate of fluid into the cartridge 4, a syringe, piston pump or other positive displacement device that can meter desired amounts of liquid (whether water, citric acid or other material) to the cartridge 4, and others. In another embodiment, the activating fluid supply 20 may include a gravity fed liquid supply that has a controllable delivery rate, e.g., like the drip-type liquid supply systems used with intravenous lines for providing liquids to hospital patients, or may spray atomized water or other liquid to provide a water vapor or other gas phase activating fluid to the cartridge 4.

A carbon dioxide gas supply 30 may be arranged to provide carbon dioxide gas from the cartridge 4 to an area where the gas is used to carbonate the liquid 2, in this case, the carbonation tank 6. The gas supply 30 may be arranged in any suitable way, and in this illustrative embodiment includes a conduit that is fluidly connected between the cartridge 4 and a carbonated liquid outlet of the carbonation tank 6. A gas control valve 51d is controllable by the control circuit 5 to open and close the flow path through the gas supply conduit. (Note that in some embodiments, the valve 51d may be a check valve that is not controllable by the control circuit 5.) In accordance with an aspect of the invention, the carbonation gas is delivered via a carbonating gas supply line that is fluidly coupled to the dispense line of the carbonation tank so as to deliver carbon dioxide gas to the outlet of the carbonation tank to carbonate the precursor liquid. This arrangement may provide advantages, such as introducing the carbonating gas at a relatively low point in the tank, which may help increase contact of the gas with the precursor liquid, thereby enhancing dissolution of the gas. In addition, the flow of carbonating gas through at least a portion of the dispense line 38 may help purge the dispense line 38 of liquid, helping to re-carbonate the liquid, if necessary. The gas conduit may be connected to the dispense line 38 close to the dispense valve 51e so as to purge as much liquid from the dispense line 38 as possible.

The gas supply 30 may include other components than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. (The use of an accumulator or similar gas storage device may obviate the need to control the rate of gas output by a cartridge. Instead, the gas source may be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate.) Also, carbonation of the precursor liquid 2 may occur via one or more mechanisms or processes, and thus is not limited to one particular process. For example, while delivery of carbon dioxide gas to the outlet of the carbonation tank 6 may function to help dissolve carbon dioxide in the liquid 2, other system components may further aid in the carbonation process. In some embodiments, a sparger may be used to introduce gas into the carbonation tank, precursor liquid may be circulated in the tank, and/or other techniques may be used to alter a rate at which carbonating gas is dissolved.

Before, during and/or after carbonation of the liquid 2 in the carbonation tank 6, the cooling system 7 may chill the liquid 2. As noted above, the cooling system 7 may operate in any suitable way, e.g., may include ice, refrigeration coils or other cooling elements in thermal contact with the carbonation tank 6. In addition, the carbonation tank 6 may include a mixer or other agitator to move the liquid in the tank 6 to enhance gas dissolution and/or cooling. Operation in forming a beverage may continue for a preset amount of time, or based on other conditions, such as a detected level of carbonation, a drop in gas production by the cartridge 4, or other parameters. During operation, the amount of liquid provided to the cartridge 4 may be controlled to control gas output by the cartridge 4. Control of the liquid provided to the cartridge 4 may be made based on a timing sequence (e.g., the valve 51c may be opened for a period of time, followed by valve closure for a period, and so on), based on detected pressure (e.g., liquid supply may be stopped when the pressure in the tank 6 exceeds a threshold, and resume when the pressure falls below the threshold or another value), based on a volume of activating liquid delivered to the holder 3 (e.g., a specific volume of liquid may be delivered to the cartridge 4 in one or more discrete volumes), or other arrangements.

With the precursor liquid 2 in the carbonation tank 6 ready for dispensing, the vent valve 51b may be opened to reduce the pressure in the carbonation tank 6 to an ambient pressure. As is known in the art, depressurizing the carbonation tank prior to dispensing may aid in maintaining a desired carbonation level of the liquid during dispensing. With the tank 6 vented, the vent valve 51b may be closed and a pump vent valve 51a may be opened. The pump 13 may then be operated to draw air or other gas into the inlet side of the pump 13 and pump the gas into the carbonation tank 6 so as to force the precursor liquid 2 in the tank 6 to flow into the dispense line 38. That is, the arrangement of FIG. 6 incorporates another aspect of the invention in that a single pump may be used to both deliver precursor liquid to a carbonation tank or other carbonation location as well as deliver pressurized gas (air) to the carbonation tank to dispense carbonated liquid from the tank. This feature, optionally combined with the feature of using the same pump to deliver activating fluid to a gas source, may make for a simplified system with fewer components. While the pump 13 delivers air to the carbonation tank, the dispense valve 51e is opened and the gas valve 51d is closed during liquid dispensing. The dispensed liquid may enter a mixing chamber 9 at which the carbonated liquid and beverage medium provided from the lower compartment 42 of the cartridge 4 are combined. The beverage medium may be moved out of the cartridge 4 and to the mixing chamber 9 by introducing pressurized gas into the lower compartment 42, e.g., by way of an air pump 43. Other arrangements are possible, however, such as routing gas from the upper compartment 41 under pressure to the lower compartment 42.

The control circuit 5 may use one or more sensors to control a carbonation level of the precursor liquid, a temperature to which the liquid is chilled (if at all), a time at which and during which beverage medium is delivered to the mixing chamber 9, a rate at which carbonating gas is produced and delivered to the tank 6, and/or other aspects of the beverage making process. For example, a temperature sensor may detect the temperature of the precursor liquid in the carbonation tank 6. This information may be used to control system operation, e.g., warmer precursor liquid temperatures may cause the control circuit 5 to increase an amount of time allowed for carbon dioxide gas to be dissolved in the precursor liquid 2. In other arrangements, the temperature of the precursor liquid 2 may be used to determine whether the system 1 will be operated to carbonate the liquid 2 or not. For example, in some arrangements, the user may be required to add suitably cold liquid 2 (and/or ice) to the reservoir 11 before the system 1 will operate. (As discussed above, relatively warm precursor liquid 2 temperatures may cause the liquid to be insufficiently carbonated in some conditions.) In another embodiment, a pressure sensor may be used to detect a pressure in the carbonation tank 6. This information may be used to determine whether the carbonation tank 6 is properly or improperly filled, if a pressure leak is present, if carbonation is complete and/or to determine whether sufficient carbon dioxide gas is being produced by the cartridge 4. For example, low detected pressure may indicate that more carbon dioxide needs to be generated, and thus cause the control circuit 5 to allow more liquid to be delivered by the activating fluid supply 20 to the cartridge 4. Likewise, high pressures may cause the flow of liquid from the activating fluid supply 20 to be slowed or stopped. Thus, the control circuit 5 can control the gas pressure in the carbonation tank 6 and/or other areas of the system 1 by controlling an amount of liquid delivered to the cartridge 4. Alternately, low pressure may indicate that there is a leak in the system and cause the system to indicate an error is present. In some embodiments, measured pressure may indicate that carbonation is complete. For example, pressure in the tank 6 may initially be detected to be at a high level, e.g., around 70-80 psi, and later be detected to be at a low level, e.g., around 40 psi due to gas being dissolved in the liquid. The low pressure detection may indicate that carbonation is complete. A sensor could also detect the presence of a cartridge 4 in the cartridge holder 3, e.g., via RFID tag, optical recognition, physical sensing, etc. If no cartridge 4 is detected, or if the control circuit 5 detects that the cartridge 4 is spent, the control circuit 5 may prompt the user to insert a new or different cartridge 4. For example, in some embodiments, a single cartridge 4 may be used to carbonate multiple volumes of precursor liquid 2. The control circuit 5 may keep track of the number of times that the cartridge 4 has been used, and once a limit has been reached (e.g., 10 drinks), prompt the user to replace the cartridge. Other parameters may be detected by a sensor, such as a carbonation level of the precursor liquid 2 (which may be used to control the carbonation process), the presence of a suitable vessel to receive a beverage discharged from the system 1 (e.g., to prevent beverage from being spilled), the presence of water or other precursor liquid 2 in the carbonation tank 6 or elsewhere in the precursor supply 10, a flow rate of liquid in the pump 13 or associated conduit, the presence of a headspace in the carbonation tank 6 (e.g., if no headspace is desired, a valve may be activated to discharge the headspace gas, or if only carbon dioxide is desired to be in the headspace, a snifting valve may be activated to discharge air in the headspace and replace the air with carbon dioxide), and so on.

The control circuit 5 may also be arranged to allow a user to define a level of carbonation (i.e., amount of dissolved gas in the beverage, whether carbon dioxide or other). For example, the control circuit 5 may include a touch screen display or other user interface 52 that allows the user to define a desired carbonation level, such as by allowing the user to select a carbonation volume level of 1, 2, 3, 4 or 5, or selecting one of a low, medium or high carbonation level. Cartridges used by the system 1 may include sufficient gas source material to make the highest level of carbonation selectable, but the control circuit 5 may control the system to dissolve an amount of gas in the beverage that is consistent with the selected level. For example, while all cartridges may be arranged for use in creating a "high" carbonation beverage, the control circuit 5 may operate the system 1 to use less of the available gas (or cause the gas source to emit less gas than possible) in carbonating the beverage. Carbonation levels may be controlled based on a detected carbonation level by a sensor, a detected pressure in the carbonation tank 6 or elsewhere, an amount of gas output by the cartridge 4, or other features.

In another embodiment, the cartridge 4 may include indicia readably by the controller, e.g., an RFID tag, barcode, alphanumeric string, etc., that indicates a carbonation level to be used for the beverage. After determining the carbonation level from the cartridge 4, the control circuit 5 may control the system 1 accordingly. Thus, a user need not select the carbonation level by interacting with the system 1, but rather a carbonation level may be automatically adjusted based on the beverage selected. In yet another embodiment, a user may be able to select a gas source cartridge 4 that matches a carbonation level the user desires. (Different carbonation levels may be provided in the different cartridges by having different amounts of gas source in the cartridge 4.) For example, cartridges providing low, medium and high carbonation levels may be provided for selection by a user, and the user may pick the cartridge that matches the desired carbonation level, and provide the selected cartridge to the system 1. Thus, a gas source cartridge labeled "low" may be chosen and used with the system to create a low level carbonated beverage.

A user may alternately be permitted to define characteristics of a beverage to be made by interacting in some way with a cartridge 4 to be used by the system 1. For example, tab, notch or other physical feature of the cartridge may be altered or formed by the user to signify a desired beverage characteristic. For example, a broken tab, slider indicator, a covered or uncovered perforation on a portion of the cartridge, etc., that is created by the user may indicate a desired carbonation level, an amount of beverage medium to use in forming the beverage (where the system 1 is controllable to use less than all of the beverage medium in the cartridge to form a beverage), and so on. Features in the cartridge 4 may also be used by the control circuit 5 to detect features of the cartridge, a beverage being formed or other components of the system 1. For example, light guides in a cartridge 4 may provide a light path to allow the controller 5 to optically detect a level of beverage medium in the cartridge 4, a flow of precursor liquid in the cartridge 4, pressure in the cartridge (e.g., where deflection of a cartridge portion can be detected and indicates a pressure), a position of a piston, valve or other cartridge component, an absence of beverage medium in the cartridge (to signify completion of beverage formation), and so on. Other sensor features may be incorporated into the cartridge, such as electrical sensor contacts (e.g., to provide conductivity measurements representative of a carbonation level or other properties of a precursor liquid), an acoustic sensor (to detect gas emission, fluid flow, or other characteristics of the cartridge), and so on.

Figure 7:
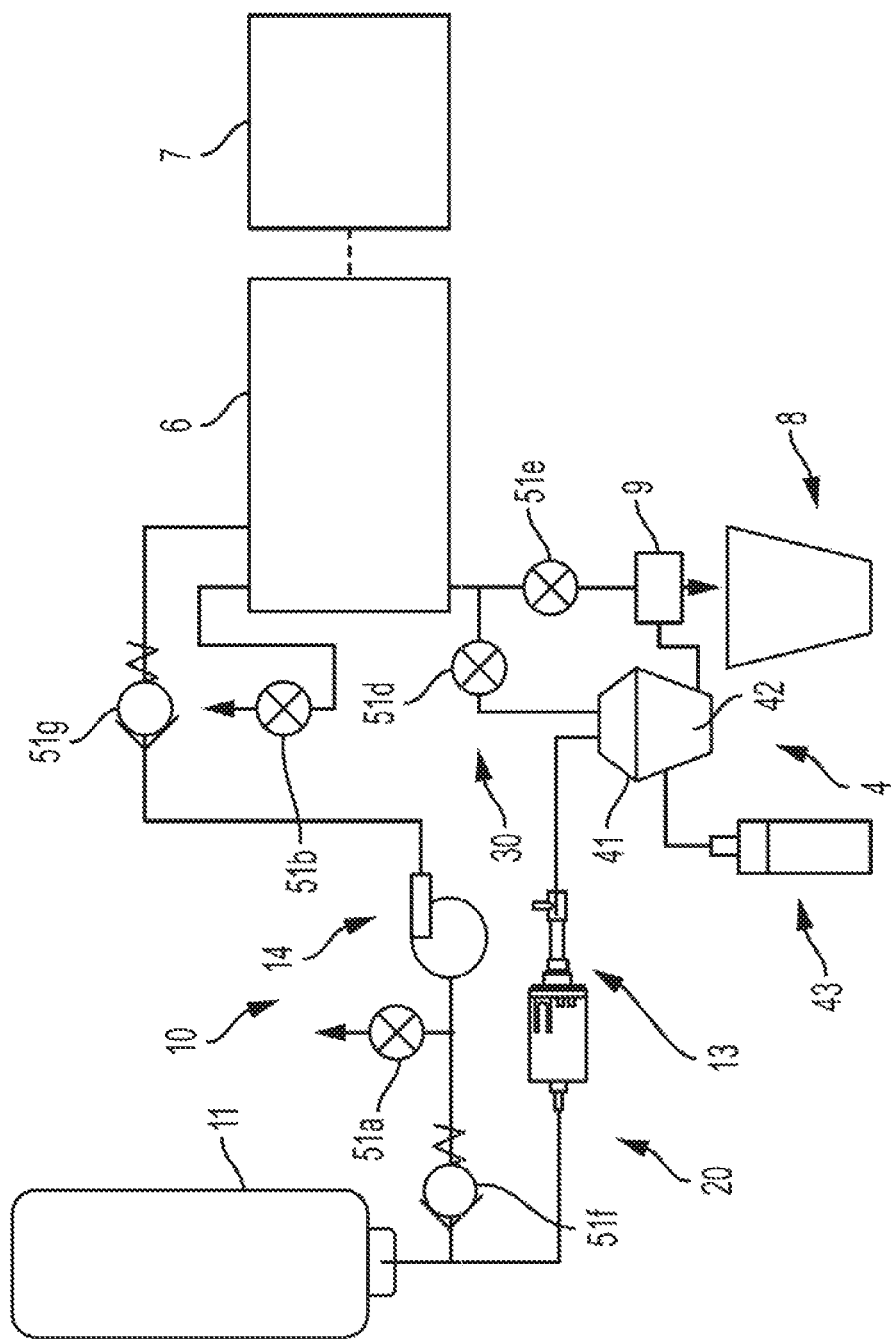
FIG. 7 shows a schematic diagram of another illustrative flow circuit in a beverage making system.

FIG. 7 shows another illustrative arrangement for flow circuitry in a beverage making system 1 that is similar to that of FIG. 6. However, in this embodiment, the activating fluid supply 20 includes a dedicated pump 13 that is distinct from a pump 14 that is part of the precursor liquid supply 10. Also, unlike the arrangement of FIG. 6, the precursor liquid supply 10 includes first and second check valves 51$f$ and 51$g$ upstream and downstream of the pump 14, which may be a diaphragm pump. The check valves 51$f$, 51$g$ may help prevent backflow from the carbonation tank 6, e.g., when the tank 6 is relatively highly pressurized during the carbonating process. Otherwise, the configuration and operation of the flow circuitry of FIG. 7 is identical to that of FIG. 6.

Figure 8:
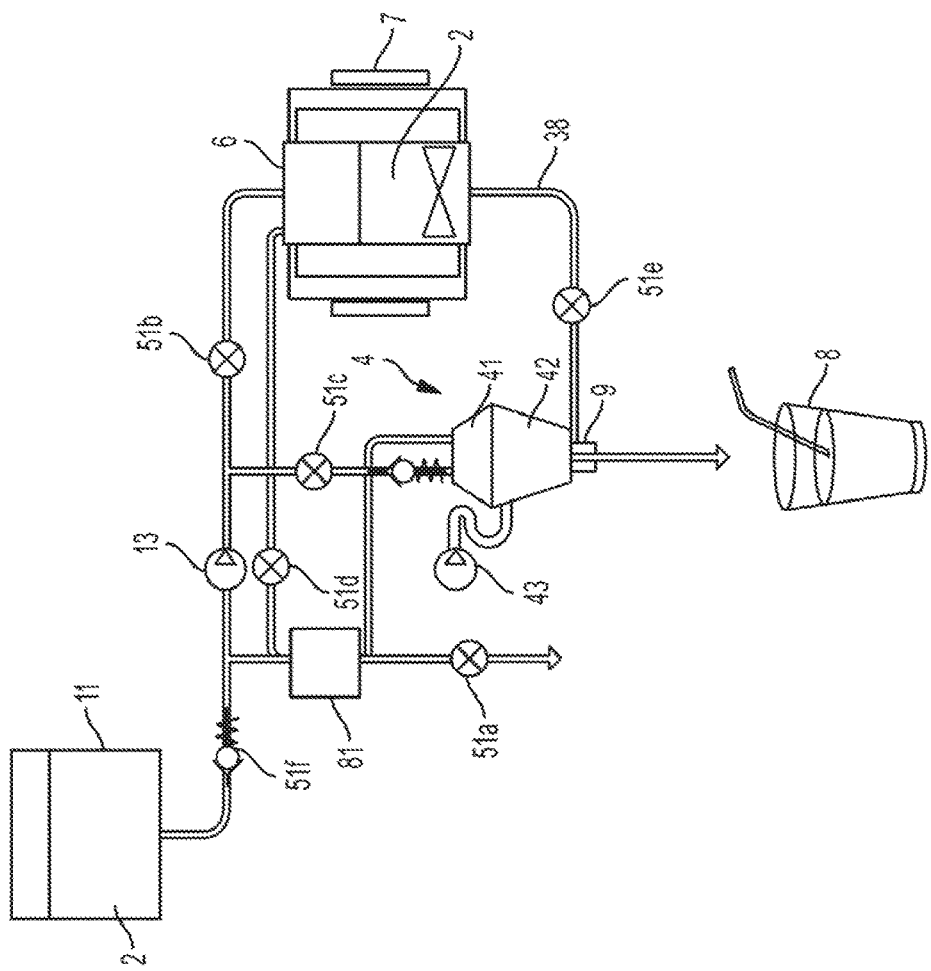
FIG. 8 shows a schematic diagram of yet another illustrative flow circuit in a beverage making system.

FIG. 8 shows yet another configuration for a beverage making system 1. Again, this arrangement is similar to that of FIG. 6, with a main difference being that, in accordance with an aspect of the invention, the carbonating gas supply includes a water trap 81 through which carbonation gas from the cartridge 4 is routed prior to passing through a gas control valve 51$d$ and to the carbonation tank 6. The water trap 81 may help remove water droplets from the carbonation gas, which may be drained through a vent valve 51$a$. That is, activating fluid is directed to the upper compartment 41 of the cartridge 4 by closing a vent valve 51$a$ and pump line valve 51$b$, opening an activating fluid valve 51$c$, and operating the pump 13 to pump liquid 2 to the upper compartment 41. Carbonating gas is directed to the carbonation tank 6 by closing the vent valve 51$a$ and pump line valve 51$b$, and opening the gas supply valve 51$d$. Note also that, in accordance with an aspect of the invention, the pressure of the carbonating gas is connected to the inlet side of the pump 13 while the pump 13 delivers activating fluid to the cartridge 4. This may help equalize or nearly equalize pressures on inlet and outlet sides of the pump 13, making pump 13 operation require less power during activating fluid delivery. With carbonation complete, the carbonation tank 6 may be vented by opening the gas control valve 51$d$ and the vent valve 51$a$. To dispense carbonated precursor liquid 2 from the tank 6, the vent valve 51$a$, pump line valve 51$b$ and dispense valve 51$e$ may be opened, the activating liquid supply valve 51$c$ and gas control valve 51$d$ closed, and the pump 13 operated to pump air into the carbonation tank 6 so liquid flows to the dispense line 38. Note that the activating liquid supply valve 51$c$ and pump line valve 51$b$ could be replaced with a single three way valve, like the three way valve 51$c$ in FIG. 6. Also, this arrangement shows a mixing chamber 9 located immediately at the outlet of the lower compartment 42 of the cartridge 4. Other arrangements are possible, however, including having the mixing chamber 9 be arranged as part of the cartridge, e.g., precursor liquid 2 could be routed from the dispense line 38 directly into a portion of the cartridge 4.

Figure 9:
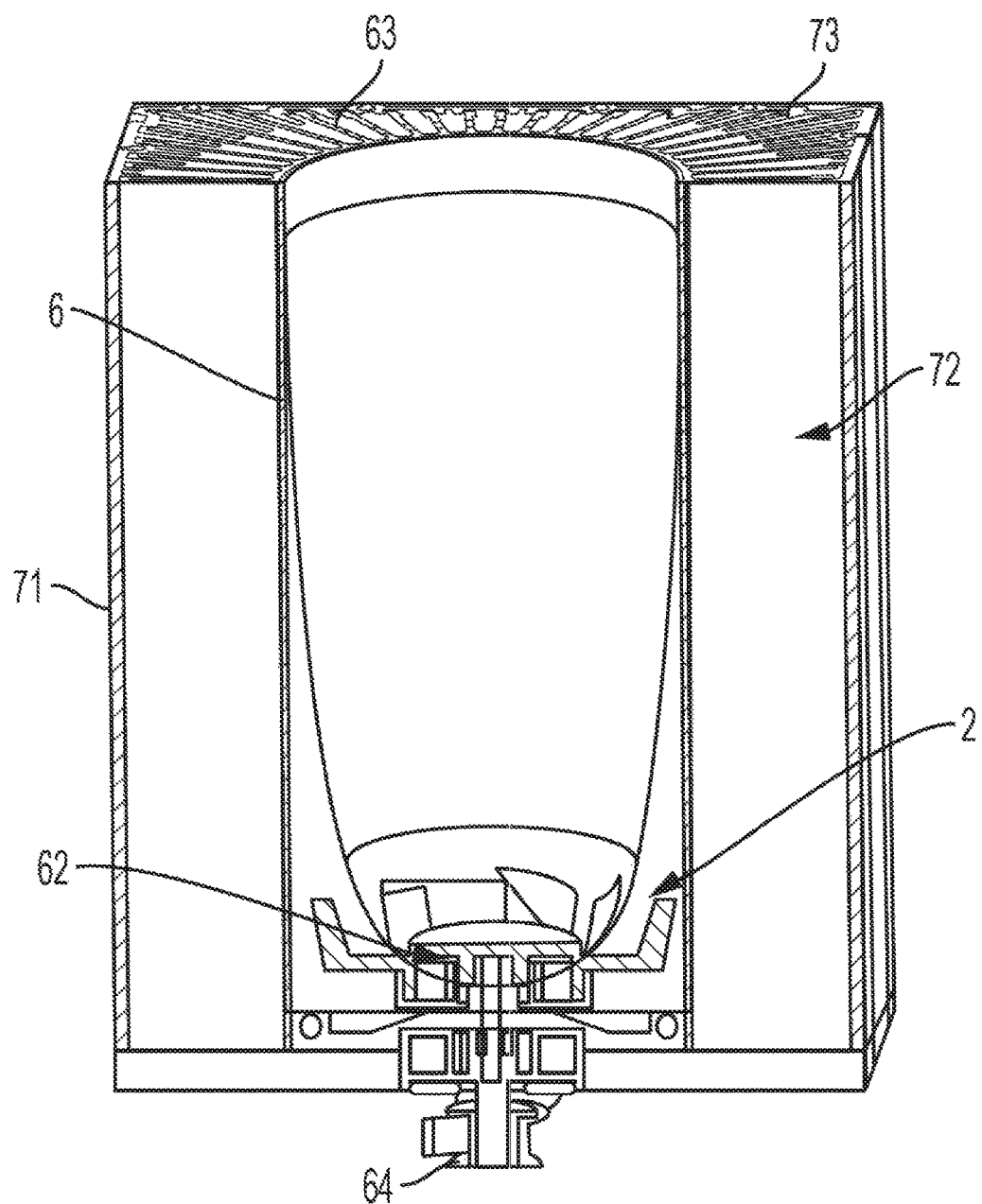
FIG. 9 shows a cross sectional view of a carbonation tank and cooling container in an illustrative embodiment.

In one aspect of the invention, the carbonation tank is surrounded by a cooling container that contains a cooling liquid and thermally conductive fins extend between the carbonation tank and the cooling container. In some arrangements, the cooling liquid may be frozen, in whole or in part, and the fins may extend radially outwardly from the carbonation tank and/or radially inwardly from an outer wall of the cooling container. Thus, at least some of the fins extending between the carbonation tank and the cooling container may be arranged to conduct heat from the tank to the cooling liquid. FIG. 9 shows a cross sectional side view of a carbonation tank and cooling container in an illustrative embodiment. While other arrangements are possible, in this embodiment the carbonation tank 6 includes fins 63 that extend outwardly toward an outer wall of the cooling container 71, and the cooling container 71 includes fins 73 that extend inwardly toward the inner wall of the carbonation tank 6. The cooling liquid 72 is contained between the cooling container 71 outer wall and the carbonation tank 6 inner wall and is in contact with at least some of the fins 63, 73. The carbonation tank 6 also includes an impeller or mixer 62 that is rotatable by a mixer drive 64 so as to mix the precursor liquid 2 in the carbonation tank 6. Movement of the liquid 2 by the mixer 62 may form a vortex or other configuration such that the liquid 2 moves upwardly along the inner wall of the carbonation tank 6 and forms a void around a center of rotation of the mixer 62. This arrangement may have two (or more) effects, including increasing an exposed surface area of the liquid 2 at the void, thereby enhancing dissolution of carbon dioxide in the liquid 2, and increasing an area of contact between the liquid 2 and the inner wall of the carbonation tank 6, thereby enhancing heat transfer. Movement of the liquid 2 may also cause mixing and/or turbulence, which may also enhance gas dissolution and/or heat transfer. The mixer 62 may be driven by any suitable arrangement, such as a magnetically-coupled motor drive, a drive shaft that extends through a bottom wall of the carbonation tank 6, or other.

Figure 10:
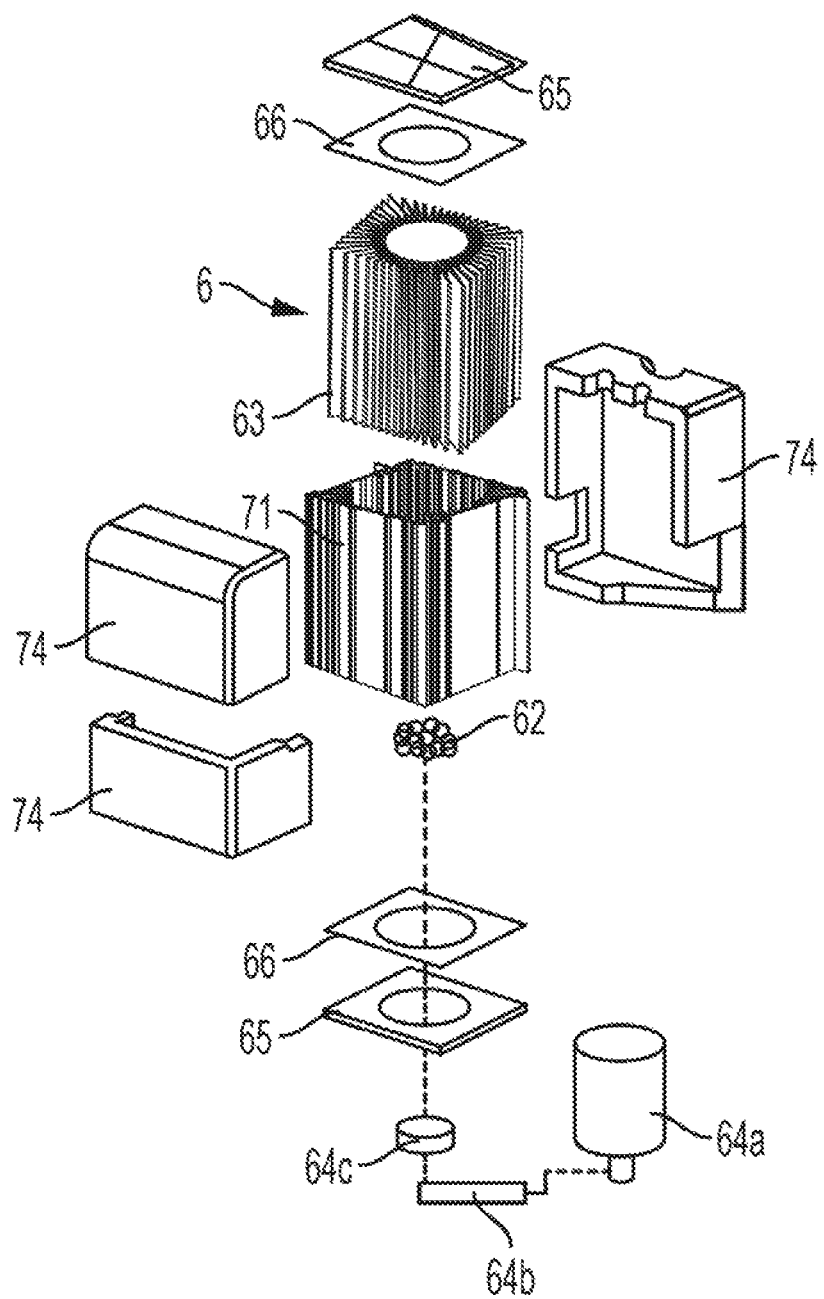
FIG. 10 shows an exploded view of a carbonation tank and cooling system in an illustrative embodiment.

FIG. 10 shows an exploded view of the carbonation tank/cooling container assembly in this embodiment. The carbonation tank 6 may be made as an extruded member, including both the inner wall and fins 63, and may be received within a space defined by the cooling container 71, which may also be made as an extruded member with the outer wall and fins 73. With the tank 6 positioned in the cooling container 71, sealing gaskets 66 and end caps 65 may be assembled at the top and bottom of the tank 6/container 71 to seal closed the carbonation tank 6 and the space between the carbonation tank 6 and the cooling container 71 where the cooling liquid 72 is located. Prior to being sealed closed by the end caps 65, the carbonation tank 6 may have the mixer 62 suitably positioned, and cooling liquid 72 may be provided around the tank 6. The mixer drive 64 may include a motor 64a, drive belt 64b and drive pulley 64c (or other arrangement) to rotate the mixer 62. Insulation 74 may also be provided around the cooling container 71, if desired.

Figure 12:
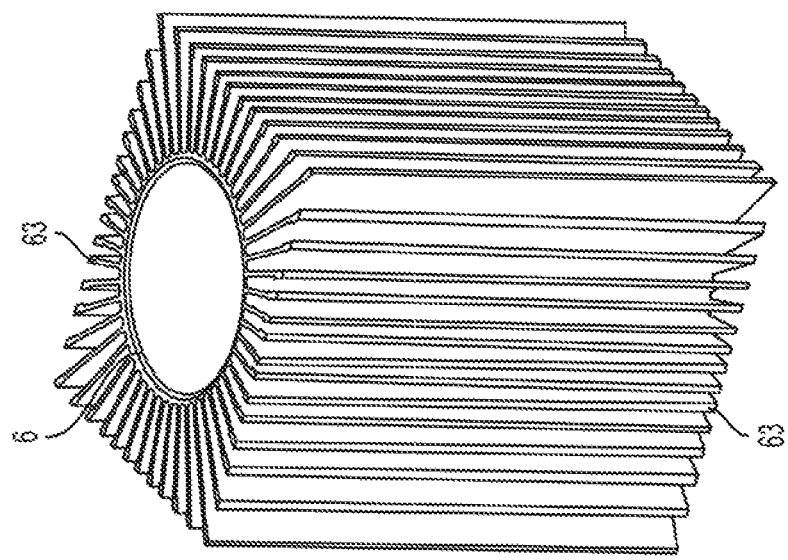
FIG. 12 shows a perspective view of the carbonation tank of FIG. 11.
Figure 11:
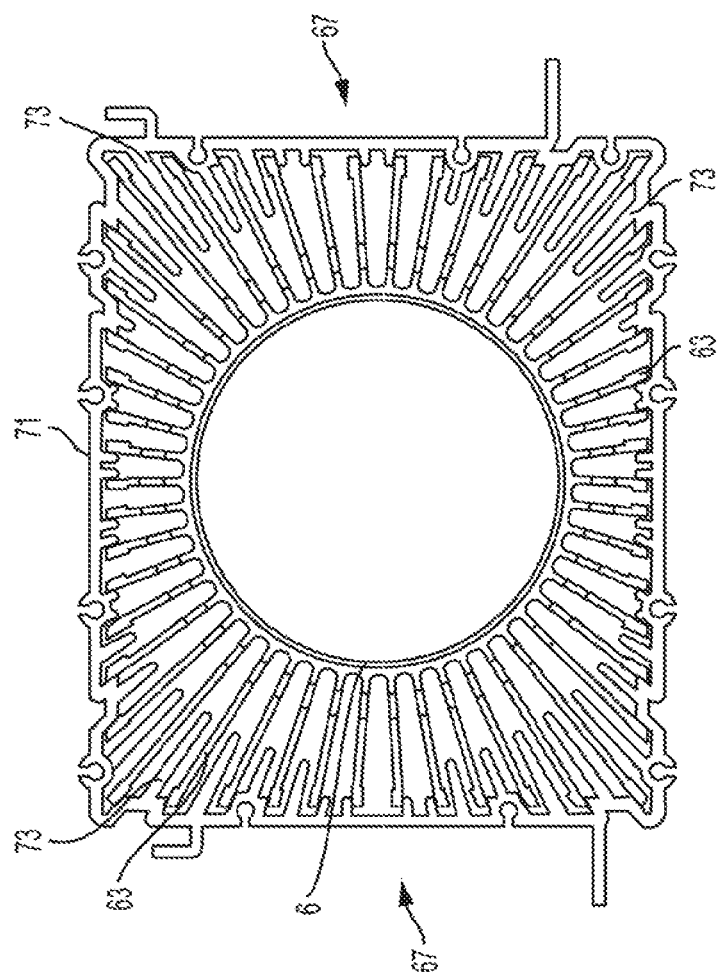
FIG. 11 shows a top view of an assembled carbonation tank and cooling container in an illustrative embodiment.

FIG. 11 shows a top view of a carbonation tank 6 assembled with a cooling container 71, and FIG. 12 shows a perspective view of the carbonation tank 6 alone in another embodiment. In this embodiment, the inner wall of the carbonation tank 6 has a cylindrical shape, but other shapes are possible. Also, the cooling container 71 includes cooling device mounts 67 on opposed sides, but such mounts are not necessary, e.g., may be provided on the carbonation tank 6, if desired. The cooling device mounts 67 are configured to receive thermoelectric cooling devices that are directly mounted to the exposed surface of the mounts 67 so the thermoelectric devices can receive heat from the precursor liquid in the tank 6 and/or the cooling liquid 72, but other arrangements are possible, such as thermally coupling one or more heat pipes, a refrigeration coil, a heat sink or other devices to receive heat from the carbonation tank 6 is possible.

In this embodiment, the carbonation tank 6 includes a plurality of fins 63 that have a portion which is attached to the tank and extends radially away from the tank wall. Similarly, the cooling container 71 includes a plurality of fins 73 that have a portion which is attached to the outer wall of the container 71 and extend inwardly. The fin portions 63 engage with the fin portions 73 so that the fin portions 63, 73 can exchange heat at the area of contact of the fin portions 63, 73. That is, the fin portions 63, 73 have side surfaces that contact each other, e.g., overlapping portions, so that the portions 63, 73 can transfer heat. In this arrangement, the side surfaces of at least some of the fin portions 63, 73 are pressed together so as to be in contact, but are separable from each other, e.g., are not welded or adhered to each other. In some cases like that shown in FIG. 10, the cooling container and tank may be assembled by inserting the tank 6 inside of the cooling container 71 and such that the side surfaces of corresponding fin portions 63, 73 fins are pressed into contact with each other. For example, side surfaces of an adjacent pair of fin portions 63 of the carbonation tank 6 may be positioned inside of, and in contact with, opposed side surfaces of an adjacent pair of fin portions 73 of the cooling container 71. Contact of the fin portions 63, 73 may cause the fin portions 63, 73 to flex, thereby biasing the side surfaces of the fin portions 63, 73 into contact with each other. Of course, other arrangements are possible, and as can be seen in FIG. 11, not every fin portion 63, 73 need contact another fin portion 63, 73. Also, in this embodiment, the cooling container 71 is arranged have a continuous outer wall that encloses the carbonation tank 6 as in FIG. 10, but the container 71 could be arranged as a clam shell type arrangement with two wall sections that sandwich the carbonation tank 6 so that a portion of the tank 6, such as a portion that includes mounts 67, are exposed. Thus, this configuration can be changed, e.g., the container 71 can include the mounts 67 which are pressed into contact with the inner wall of the carbonation tank 6 and/or fins 63 to receive heat from the tank 6. Alternately, the container 71 and the carbonation tank 6 could be molded or extruded as a single, unitary part, e.g., made of injection molded plastic.

In accordance with another aspect of the invention, a cooling system for chilling precursor liquid may include a thermoelectric device thermally coupled to a carbonation tank to cool precursor liquid in the tank, one or more heat pipes each having an evaporator section thermally coupled to the thermoelectric device to receive heat from the thermoelectric cooler, and a heat sink thermally coupled to the condenser section of the one or more heat pipes to receive heat from the heat pipe. Such an arrangement has been found to be particularly effective in rapidly cooling precursor liquid, especially with the relatively low power draw requirements for household appliances in some jurisdictions, e.g., 115-120 volts, 15-20 amps maximum. That is, using heat pipes to thermally couple the "hot" side of a thermoelectric device to a heat sink has been found to be significantly more effective in suitably cooling the thermoelectric device than having a heat sink in direct contact with the "hot" side of the thermoelectric device.

Figure 13:
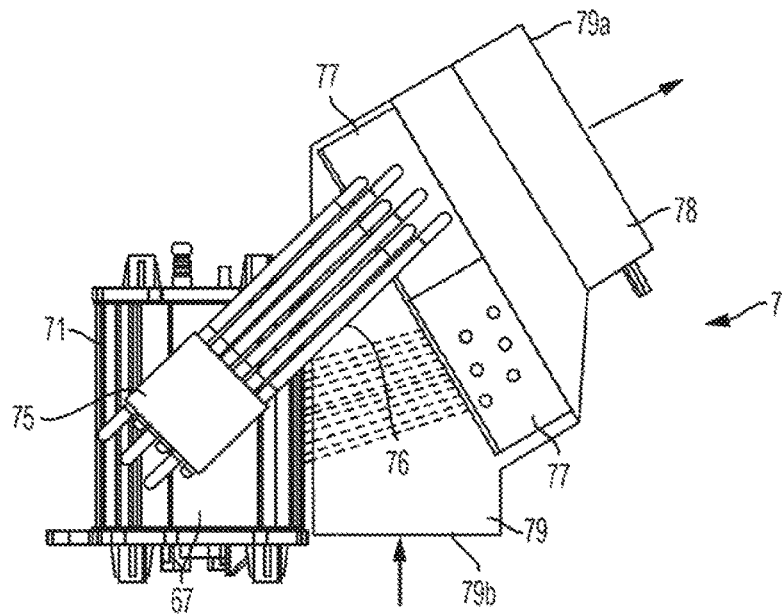
FIG. 13 shows a schematic view of a cooling system in an illustrative embodiment.

FIG. 13 shows one illustrative embodiment in which two thermoelectric devices 75 (only one is shown in FIG. 13) are coupled to the thermoelectric device mounts 67 of the carbonation tank 6. Heat pipes 76 (six for each thermoelectric device 75 in this embodiment though other numbers are possible) have respective evaporator sections coupled to the thermoelectric device, and have respective condenser sections coupled to a heat sink 77, e.g., a set of radiator fins. Air may be moved over the heat sinks 77 by a fan 78, and a duct 79 may suitably direct the flow of air such that relatively cool air enters a duct inlet 79b near a bottom of the duct 79 and exits a duct outlet 79a at the fan 78.

Figure 14:
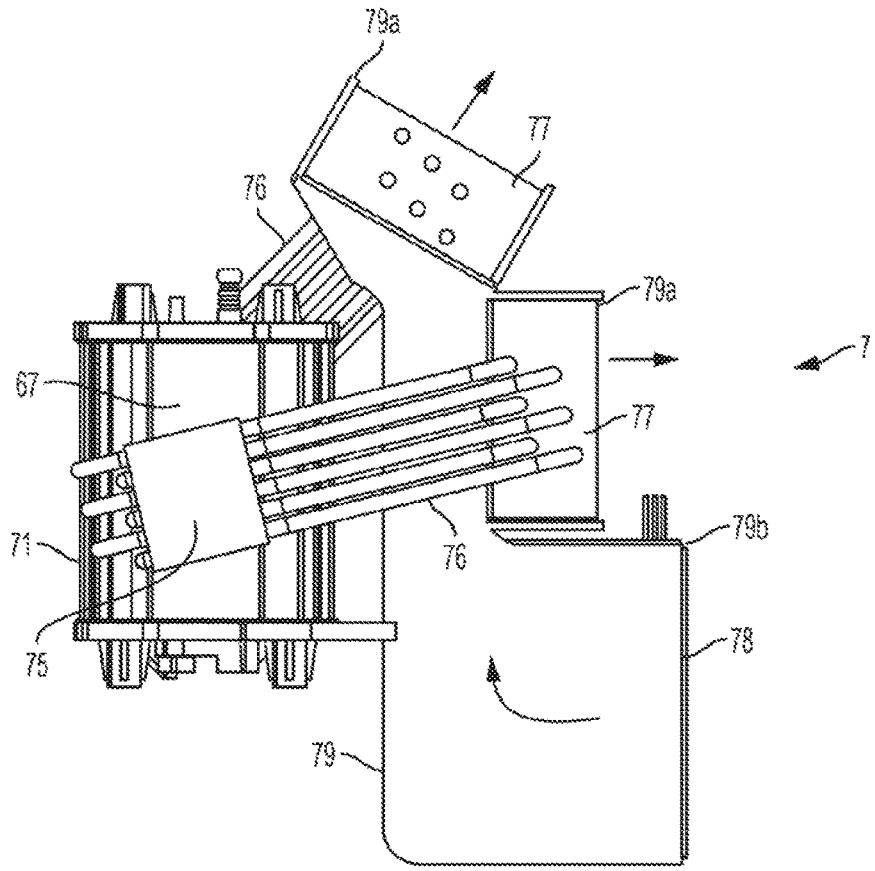
FIG. 14 shows a schematic view of another cooling system in an illustrative embodiment.

FIG. 14 shows another cooling system 7 arrangement that also has two thermoelectric devices 75 and corresponding heat pipes 76 and heat sinks 77. However, in this embodiment, the fan 78, duct 79 and the heat sinks 77 are differently arranged such that the fan 78 is at the duct inlet 79b and pushes cooling air into the duct 79 so the air may pass through the heat sinks 77 and exit via a respective duct outlet 79a located at each heat sink 77. This configuration could be used in an arrangement discussed above where a duct outlet 79a is located at a top of a system housing 21 and adjacent a precursor liquid inlet opening. For example, the duct 79 in this embodiment is arranged so that liquid entering the duct outlet 79a can flow downwardly in the duct 79 to a bottom of the housing 21. Openings in the duct 79 at the bottom of the housing 21 may allow the liquid to exit, e.g., and exit the housing 21. The duct 79 is isolated from electronic components of the system 1, and the heat pipes 76 may pass through the duct walls to couple with a heat sink 77 positioned in the duct 79.

Figure 15:
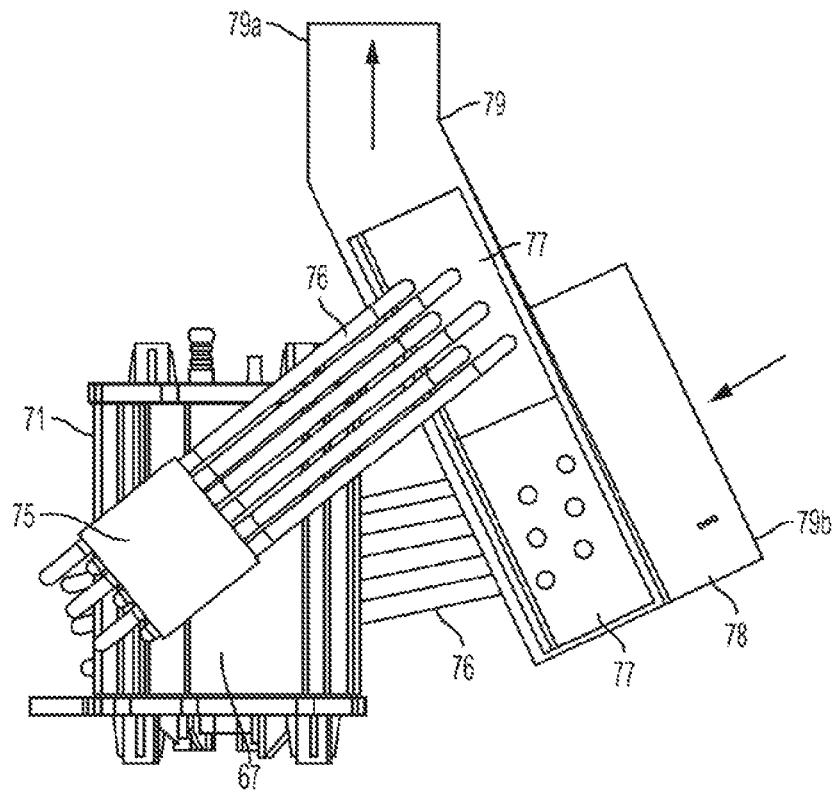
FIG. 15 shows a schematic view of yet another cooling system in an illustrative embodiment.

FIG. 15 shows another arrangement with a fan 78 positioned at a duct inlet 79b. However, in this case, the heat sinks 77 are positioned near the fan 78 so incoming air flows over the heat sinks 77, and then flows upwardly through the duct 79 to a duct outlet 79a at a top of the duct 79. This arrangement, like FIG. 14, may also be used in a configuration where a duct outlet 79a is located at a top of a system housing 21 and adjacent a precursor liquid inlet opening. Any liquid entering the duct outlet 79a may flow down the duct 79 and out through one or more openings at a low point of the duct 79. Those of skill in the art will appreciate that other arrangements are possible, including those with more or fewer thermoelectric devices 75, heat pipes 76, or heat sinks 77.

In one aspect of the invention, a method for chilling precursor liquid includes providing a cooling liquid bath around a tank containing precursor liquid to be chilled. For example, in the embodiments above, the cooling liquid 72 may be provided around the carbonation tank 6. The cooling liquid may be cooled to freeze at least some of the cooling liquid so as to form ice. For example, the thermoelectric devices 75 may be operated to remove heat from the cooling container 71, cooling liquid 72 and carbonation tank 6 so that the cooling liquid 72 is at least partially frozen. In the case of water, the cooling liquid 72 may be chilled to about 0 degrees C. to form ice. A temperature of the cooling liquid may be monitored while cooling, and cooling of the cooling liquid may be stopped when the temperature of the cooling liquid drops to a temperature that is more than a first threshold below a freezing temperature of the liquid. For example, the cooling liquid 72 may be chilled to a temperature about −4 degrees C., i.e., more than a threshold of 2-4 degrees below a 0 degree C. freezing temperature for the cooling liquid 72 in the case of water. Of course, a glycol or other anti-freeze compound may be provided to lower the freezing temperature of the cooling liquid, if desired.

In some cases, cooling of the cooling liquid may start when the temperature of the cooling liquid is a temperature above a second threshold above a freezing temperature of the liquid. That is, once the cooling liquid is suitably chilled below its freezing temperature, the thermoelectric devices or other devices may stop operating until the cooling liquid warms to a temperature that is more than a second threshold above or below the cooling liquid's freezing temperature. In the example above, cooling of the cooling liquid may start upon the cooling liquid warming to a temperature of that is 1-2 degrees below its 0 degree C. freezing temperature. Of course, other thresholds may be used than a threshold of 1 to 2 degrees C. For example, the first and/or second threshold may be 1 to 4 degrees C.

As described above, heat may be removed from the cooling liquid in different ways, such as by operating a thermoelectric device and removing heat from the thermoelectric device by at least one heat pipe and a heat sink. The thermoelectric device may remove heat from the cooling liquid by removing heat from the cooling container and/or from the carbonation tank.

Figure 16:
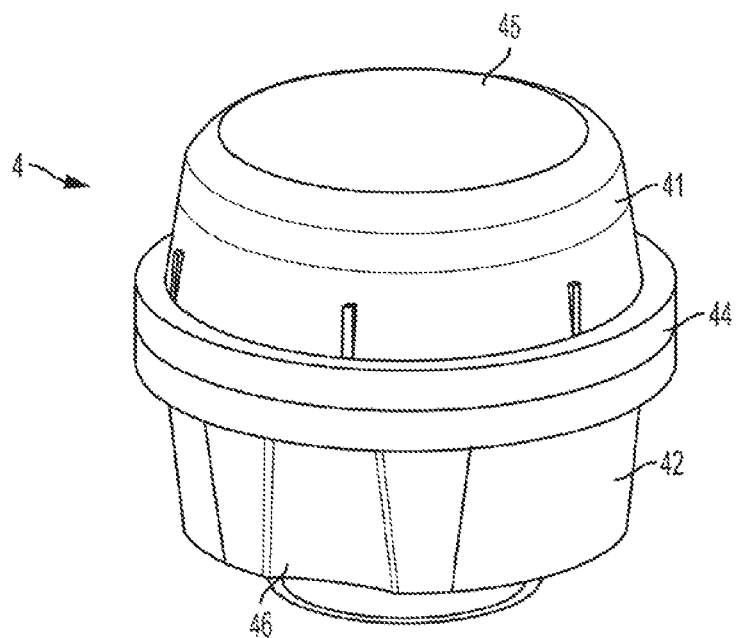
FIG. 16 shows a perspective view of a cartridge which can be used with the FIGS. 1-4 embodiment.
Figure 17:
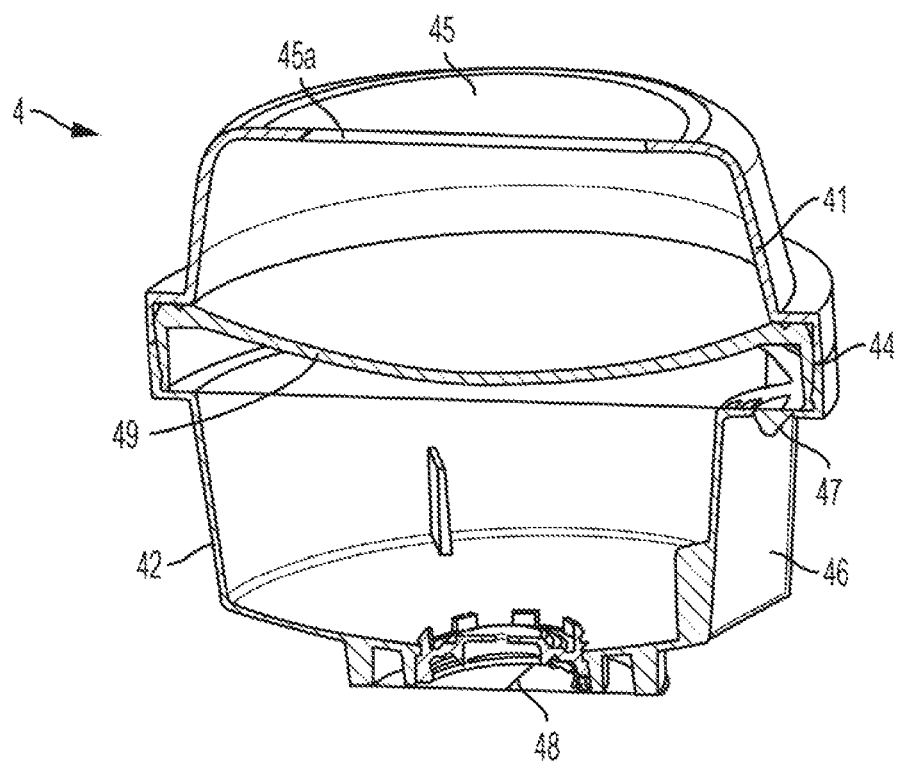
FIG. 17 shows a cross sectional view of the FIG. 16 cartridge.
Figure 18:
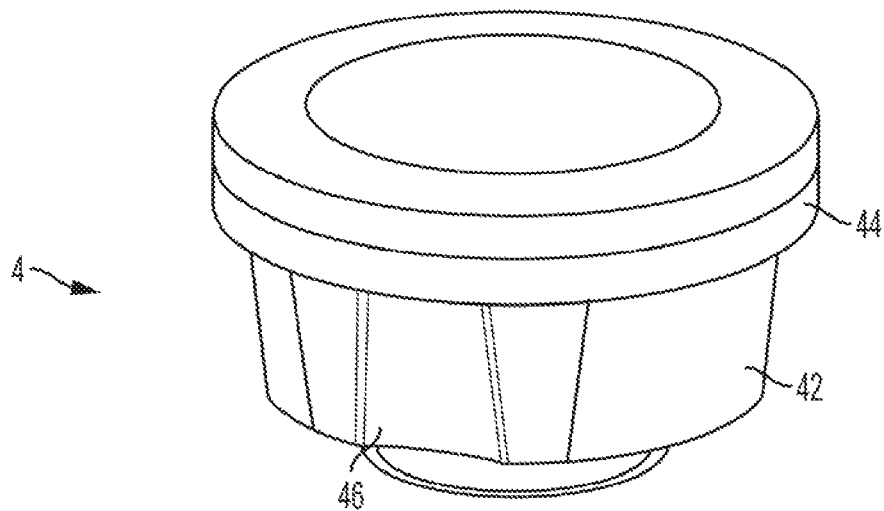
FIG. 18 shows a perspective view of another illustrative cartridge.

While systems for making a beverage may be used with different cartridge configurations, FIGS. 16 and 17 shows a cartridge 4 that may be used with a beverage making system 1. In this embodiment, the cartridge 4 includes a container that defines an upper compartment or chamber 41, a lower compartment or chamber 42, and a rim or band 44 between a top and bottom of the cartridge 4. The top of the cartridge 4 includes a lid 45 that covers an opening of the container. The lid 45 is piercable to form one or more openings so as to access a gas source (not shown) in the upper compartment 41. (Although in this embodiment, the lid 45 is a separate element, such as a sheet of foil/polymer laminate attached to the container body, the lid may be molded or otherwise formed integrally with the body.) Also, a filter 45a may be positioned below the lid 45, e.g., spaced apart from the lid 45 but parallel to the lid 45 although other arrangements are possible. This filter 45a may help prevent gas source material from exiting the upper compartment 41 during gas production. The upper compartment 41 is also defined in part by a wall 49 that has a concave up curve, but such a shape is not necessary, e.g., the wall 49 may be flat or concave down. The cartridge 4 also includes a piercable inlet 47 located at an underside of the rim 44 and at an indexing groove 46 of the cartridge 4. As is discussed in more detail below, the inlet 47 may be pierced to allow access to the lower compartment 42, e.g., so pressurized gas or liquid can be introduced into the lower compartment 42 to move a beverage medium (not shown) out of an outlet 48 of the lower compartment 42. In this embodiment, the outlet 48 includes a piercable membrane that can be pierced and opened to allow the beverage medium to exit, although other arrangements are possible, e.g., a self-closing septum valve or burstable seal may be provided at the outlet 48 that opens with increased pressure in the lower compartment 48. Cartridges are not limited to the arrangement shown in FIGS. 16 and 17, however, and a beverage making system 1 may be arranged to operate with cartridges 4 that include only a gas source (e.g., only a rim 44 and upper compartment 41) to make a carbonated water, or only a beverage medium (e.g., only a rim 44 and lower compartment 42 like that shown in FIG. 18) to make a still, flavored beverage.

The cartridge 4 may be made of any suitable materials, and is not necessarily limited to the constructions shown herein. For example, the cartridge may be made of, or otherwise include, materials that provide a barrier to moisture and/or gases, such as oxygen, water vapor, etc. In one embodiment, the cartridge may be made of a polymer laminate, e.g., formed from a sheet including a layer of polystyrene, polypropylene and/or a layer of EVOH and/or other barrier material, such as a metallic foil. Moreover, the cartridge materials and/or construction may vary according to the materials contained in the cartridge. For example, a portion of the cartridge 4 containing a gas source material may require a robust moisture barrier, whereas a beverage medium portion may not require such a high moisture resistance. Thus, the cartridges may be made of different materials and/or in different ways. In addition, the cartridge interior may be differently constructed according to a desired function. For example, a beverage medium cartridge portion may include baffles or other structures that cause the liquid/beverage medium to follow a tortuous path so as to encourage mixing. The gas source cartridge portion may be arranged to hold the gas source in a particular location or other arrangement in the interior space, e.g., to help control wetting of the gas source with activating liquid. Thus, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material). The cartridge may be impervious to air and/or liquid, or may allow water and/or air to pass into the cartridge.

A cartridge may also be arranged to provide a visual or other detectable indication regarding the cartridge's fitness for use in forming a beverage. For example, the cartridge may include a pop-up indicator, color indicator or other feature to show that the gas source has been at least partially activated. Upon viewing this indication, a user may determine that the cartridge is not fit for use in a beverage making machine. In another embodiment, an RFID tag may be associated with a sensor that detects gas source activation (e.g., via pressure increase), beverage medium spoilage (e.g., via temperature increase), or other characteristic of the cartridge, which may be transmitted to a reader of a beverage making machine. The machine may display the condition to a user and/or prevent activation of the machine to use the cartridge to form a beverage.

In one aspect of the invention, the cartridge or cartridges used to form a beverage using the beverage making system may have a volume that is less, and in some cases substantially less, than a beverage to be made using the cartridge(s). For example, a cartridge may have upper and lower compartments 41, 42 that each have a volume that is about 50 ml or less, and yet can be used to form a beverage having a volume of about 200-500 ml or more. The inventors have found (as shown in some of the Examples below) that an amount of charged carbon dioxide adsorbent (e.g., a charged zeolite) of about 30 grams (which has a volume of less than 30 ml) can be used to produce about 300-500 ml of carbonated water having a carbonation level of up to about 3.5 volumes. Moreover, it is well known that beverage-making syrups or powders having a volume of less than about 50 ml, or less than about 100 ml, can be used to make a suitably flavored beverage having a volume of about 300-500 ml. Thus, relatively small volume cartridges (or a single cartridge in some arrangements) having a volume of about 100 ml to about 250 ml or less may be used to form a carbonated beverage having a volume of about 100 to 1000 ml, and a carbonation level of at least about 1.5 to 4 volumes in less than 120 seconds, e.g., about 60 seconds, and using pressures under 80 psi.

Figure 19:
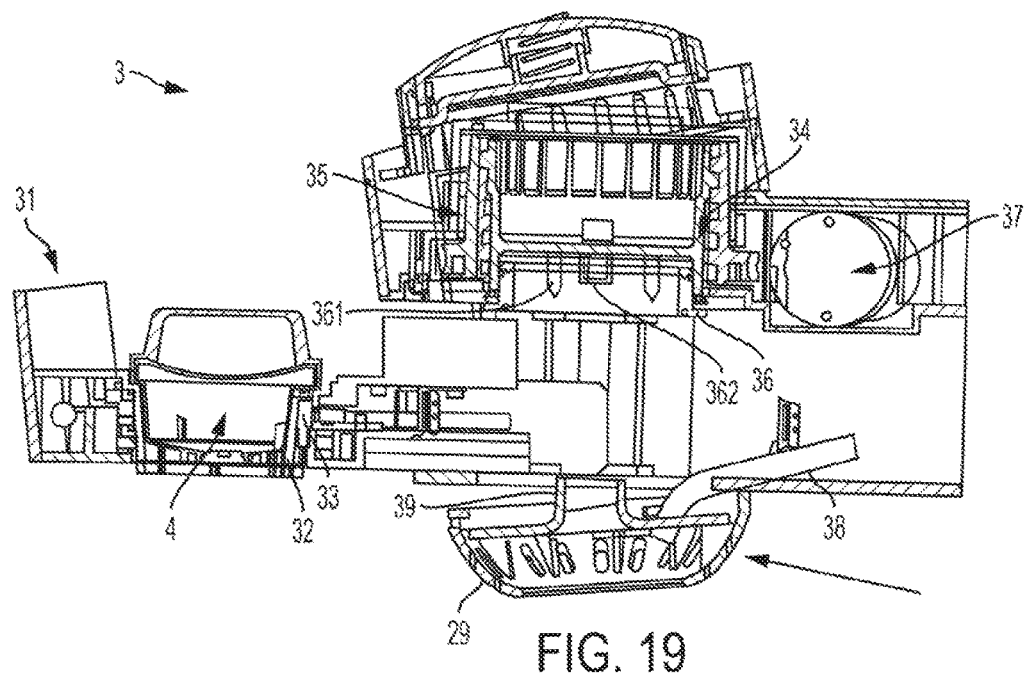
FIG. 19 shows a cross sectional view of a cartridge holder useable with the FIGS. 1-4 embodiment with a cartridge receiver in an open position.
Figure 20:
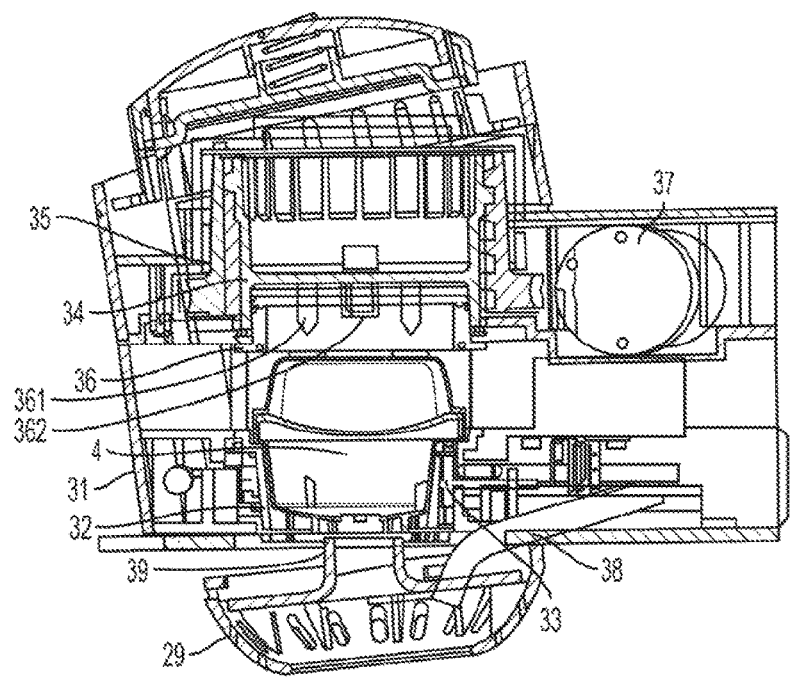
FIG. 20 shows a cross sectional view of the FIG. 19 cartridge holder with the cartridge receiver in a closed position.
Figure 21:
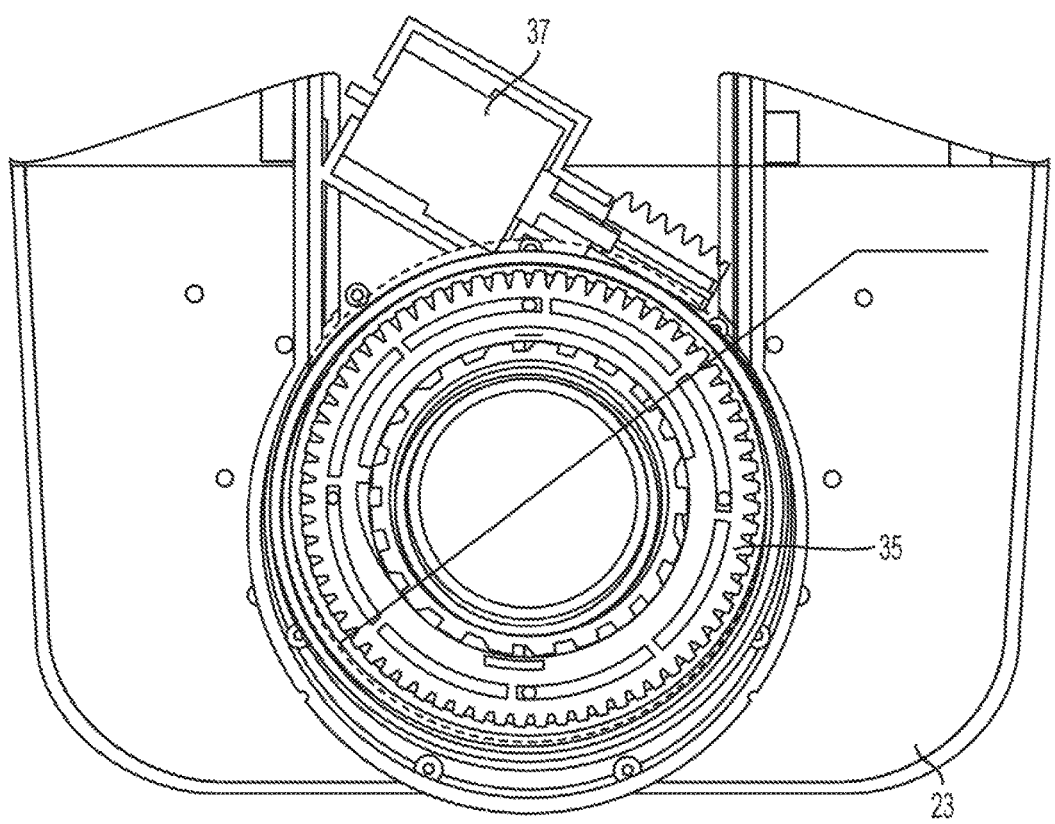
FIG. 21 shows a top view of the FIG. 19 cartridge holder.

In accordance with an aspect of the invention, a cartridge may be held by a cartridge holder of a beverage making machine such that an upper compartment of the cartridge is held in a space and has a pressure that is different from a space where a lower compartment of the cartridge is held. For example, the upper compartment may be held in a sealed space arranged to receive relatively high pressure gas used to carbonate the precursor liquid, while the lower compartment is held at ambient pressure. Such an arrangement may help isolate the lower compartment from relatively high pressures, e.g., preventing premature dispensing of beverage medium by introduction of high pressure gas into the lower compartment 42. FIGS. 19 and 20 show a cross sectional side view of a cartridge holder 3 that may be included with the system 1 shown in FIGS. 1-4 and which may operate with a cartridge like that shown in FIGS. 16-18. In this embodiment, a lower portion of the cartridge holder includes a sliding drawer 31 shown in an open position with a cartridge 4 positioned in a basket 32, i.e., a cartridge receiver. The cartridge may be received in the basket 32 so that the rim 44 rests on an upper ledge or surface of the basket 32 so the basket 32 supports the weight of the cartridge 4. With the cartridge 4 in the basket 32, the drawer 31 may be moved to a closed position shown in FIG. 20. Thereafter, an upper portion of the cartridge holder 3 may move downwardly to clamp the cartridge 4 in place, e.g., to house the upper compartment 41 in a sealed space. In this embodiment, the upper portion of the cartridge holder includes a threaded sleeve 34 that carries a piston 36 and can move downwardly relative to the cartridge 4 so that a lower surface of the piston 36 contacts the cartridge rim 44 and clamps downwardly on the rim 44 to form a seal between the piston 36 and the rim 44. In the embodiment, a wave spring or other resilient element is positioned between the threaded sleeve 34 and the piston 36 that urges the piston 36 to move downwardly relative to the sleeve 34. The threaded sleeve 34 and piston 36 move downwardly by rotation of a rotatable sleeve 35 positioned around a part of the threaded sleeve 34. Specifically, as can be seen in FIG. 21, a worm gear of a motor drive 37 may engage a gear of the rotatable sleeve 35 so that the motor drive 37 can rotate the rotatable sleeve 35 relative to the threaded sleeve 34. Since the rotatable sleeve 35 and the threaded sleeve 34 are engaged by a thread connection, rotation of the rotatable sleeve 35 causes the threaded sleeve 34 to move downwardly (or upwardly, depending on the direction of rotation of the rotatable sleeve 35) relative to the cartridge 4.

As the threaded sleeve 34 and the piston 36 move downwardly, the upper compartment 41 of the cartridge 4 may be received into the threaded sleeve 34/piston 36 until the piston 36 contact the cartridge rim 44 and urges the cartridge 4 to move downwardly against the lower portion of the cartridge holder. (Downward movement of the sleeve 34 relative to the piston 36 compresses the wave spring or other resilient element between the sleeve 34 and the piston 36.) This downward movement can cause two actions, i.e., piercing of the inlet 47 and the outlet 48 of the lower compartment 42. That is, the basket 32 may be movable in a vertical direction relative to the drawer 31, yet be spring biased to move upwardly and remain in an upper position even with the cartridge 4 in the basket 32. However, the clamping force of the upper portion of the cartridge holder (e.g., the threaded sleeve 34 and piston 36) can overcome the spring bias on the basket 32, causing the basket 32 and the cartridge 4 to move downwardly relative to the drawer 31. This downward movement may cause a dispense gas piercing element 33 to contact the cartridge at the inlet 47 and pierce the inlet 47 so that the dispense gas piercing element 33 can deliver pressurized gas into the lower compartment 42. (A gasket or other seal at the piercing element 33 can engage the cartridge 4 at the inlet 47 to form a leak-resistant connection at the inlet 47. As will also be understood, the dispense gas piercing element 33 may be connected to a line that provides pressurized gas, e.g., from an air pump 43.) In accordance with an aspect of the invention, the cartridge may be pierced at an underside of the rim 44 to provide an opening through which pressurized gas can be introduced to move beverage medium out of the lower compartment 42. Since the rim 44 may be made relatively robustly to establish a desired seal with the cartridge holder and to oppose a piercing force of the piercing element 33, a remainder of the cartridge 4 may be made out of relatively weak or less robust material or construction, e.g., to reduce cost and/or weight of the cartridge. Thus, the cartridge may be arranged to allow for reliable piercing for introduction of pressurized gas into the lower compartment 42 and sealing with the cartridge holder at the rim 44, yet still keep materials requirements to a minimum.

Downward movement of the cartridge 4 and basket 32 may also cause an outlet piercing element 39 to contact the piercable membrane or other cartridge portion at the outlet 48 so that the outlet 48 is opened. In this embodiment, the outlet piercing element 39 includes an annular rim that contacts the piercable membrane and is received into an annular groove of the cartridge 4 above the piercable membrane. Movement of the annular rim into the groove stresses the piercable membrane such that the membrane, which may be scored or otherwise have a line of weakness that defines a preferential opening area, to be pierced and pulled back so the outlet 48 can dispense beverage medium to the dispense station 29. A dispense line 38 for precursor liquid may also lead to the dispense station 29 so the precursor liquid 2 and beverage medium can be dispensed together, or separately, into a user's cup 8.

Downward movement of the upper portion of the cartridge holder 3 may also cause piercing of the cartridge lid 45 or other action such that the upper compartment 41 can be accessed. In this illustrative embodiment, the piston 36 includes a pair of piercing elements 361 arranged to pierce the lid 45 to introduce activating fluid into the upper compartment 41, and a piercing element 362 arranged to pierce the lid 45 to allow gas emitted by the gas source to exit the cartridge 4. Though not necessary, the piercing elements 361 are arranged to penetrate through the lid 45 and the filter 45a so that activating fluid can be introduced below the filter 45a. However, the piercing element 362 is arranged to pierce only the lid 45, but not the filter 45a. In this way, gas emitted in the upper compartment 41 must pass through the filter 45a before exiting to the carbonating gas supply. This may help prevent gas source material, such as zeolite particles, from exiting the cartridge 4 and passing to the carbonating gas supply 30. A variety of arrangements are possible for the filter 45a, such as a piece of filter paper mentioned above, a hydrophobic non-woven material that permits gas to pass, but resists liquid passage, or other element that permits gas to exit the cartridge 4, but resists movement of gas source material and/or liquid. In addition or alternately to the filter 45a, a conduit that receives the carbonating gas may include a filter element, such as a filter plug in the conduit, to help further resist movement of gas source materials to the carbonation tank 6. The piercing elements, may include a hollow needle, spike, blade, knife or other arrangement, to form a suitable opening in the cartridge 4. In this embodiment, the piercing elements 361 include tubular elements with an activating fluid discharge opening at a distal end such that activating fluid can be released from the piercing elements 361 below the filter 45a. In contrast, the piercing element 362 is relatively dull so as to penetrate the lid 45, but not the filter 45a. Alternately, the cartridge 4 may have defined openings, e.g., one or more ports, that include a septum or other valve-type element that permits flow into and/or out of the cartridge 4.

It should be understood that a cartridge holder 3 is not necessarily limited to the embodiments described herein. For example, the cartridge holder may open and close in any suitable way to allow cartridges 4 to be placed in and/or removed from the holder 3. In one embodiment, a cartridge holder may include a lid pivotally mounted to a receiver portion of the holder 3, and may be opened and closed manually, such as by a handle and linkage arrangement, or automatically, such as by a motor drive, to close the cartridge holder 3. Of course, the lid may be arranged in other ways, such as being engaged with the cartridge receiver by a threaded connection (like a screw cap), by the cartridge receiver moving relative to the lid while the lid remains stationary, by both the lid and receiver portion moving, and so on. In addition, a cartridge holder 3 need not necessarily have a lid and receiver arrangement, but instead may have any suitable member or members that cooperate to open/close and support a cartridge. For example, a pair of clamshell members may be movable relative to each other to allow receipt of a cartridge and physical support of the cartridge. Some other illustrative cartridge holder arrangements are shown, for example, in U.S. Pat. Nos. 6,142,063; 6,606,938; 6,644,173; and 7,165,488. As mentioned above, the cartridge holder 3 may allow a user to place one or more cartridges in the holder 3 without the need for the user to take special steps to establish a pressure-tight, leak-proof or other specialized connection between the cartridge and other portions of the system 1. Instead, in some embodiments, the user may be able to simply place the cartridge in a receiving space, and close the cartridge holder.

Figure 22:
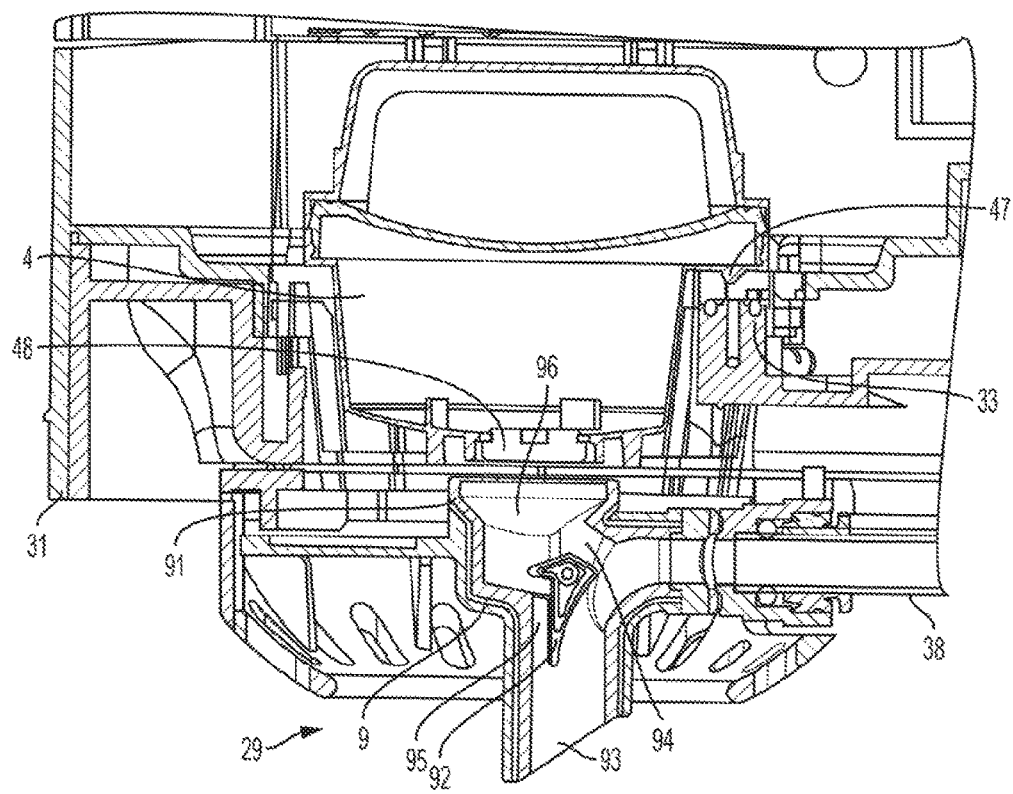
FIG. 22 shows a cross sectional view of an alternative cartridge holder including a mixing chamber.
Figure 23:
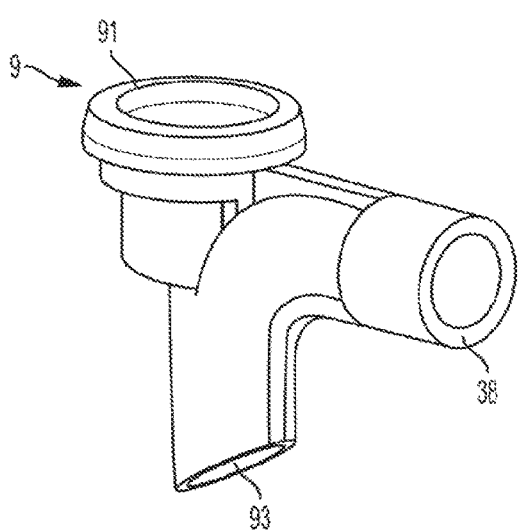
FIG. 23 perspective view of the mixing chamber of FIG. 22.
Figure 24:
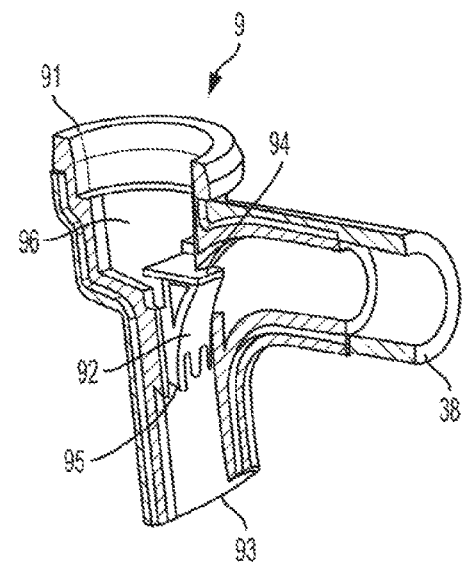
FIG. 24 shows a cross sectional view of the FIG. 22 mixing chamber.

While in the embodiment shown in FIGS. 20 and 21 a beverage medium and precursor liquid are dispense separately into a user's cup, in one aspect of the invention, beverage medium and precursor liquid are mixed in a mixing chamber and then dispensed to a user's cup. While such mixing may not completely combine beverage medium and precursor liquid together to form a completely homogenous beverage, the beverage medium and precursor liquid may be combined at least in some way, e.g., like that found in some soda fountains. As can be seen in FIGS. 22-24, an alternate embodiment that includes a mixing chamber 9 downstream of a cartridge outlet 48 can operate to mix precursor liquid and beverage medium. The mixing chamber 9 in this embodiment has three main sections, i.e., a syrup or beverage medium chamber 96 that receive beverage medium from a cartridge 4, a precursor liquid inlet that is coupled to the dispense line 38, and a dispense outlet 93 where precursor liquid and/or beverage medium are dispensed. Pressurized gas introduced into the lower compartment 42 by the dispense gas piercing element 33 causes beverage medium (in this case a syrup) to exit through the outlet 48 and enter the syrup chamber 96. Pressure in the lower compartment 42 and in the syrup chamber 96 forces beverage medium to move to the syrup chamber outlet 95 where the beverage medium can flow to the dispense outlet 93. The syrup chamber outlet 95 may include multiple channels that lead downwardly from the syrup chamber 96, e.g., so that relatively thin streams of syrup pass to the dispense outlet 93. These thin streams of beverage medium may allow for faster mixing or other combination with precursor liquid that flows from the dispense line 38 to the dispense outlet 93. The syrup chamber 96 also has a syrup chamber inlet 94 that is in communication with the precursor liquid that enters the mixing chamber 9 via the dispense line 38. So long as relatively high pressure is present in the syrup chamber 96 (due to pressurized gas being introduced into the lower compartment 42), precursor liquid will generally not enter the syrup chamber 96 via the syrup chamber inlet 94. However, once pressure in the syrup chamber 96 drops to a suitable level, precursor liquid may enter the syrup chamber 96 through the syrup chamber inlet 94. (As will be understood, the size, shape and/or position of the syrup chamber inlet 94 opening(s) may influence how, whether and when precursor liquid enters the syrup chamber 96.) Precursor liquid in the syrup chamber 96 may mix with any beverage medium that is present, as well as wash or rinse the syrup chamber 96 and syrup chamber outlet 95 of beverage medium. Accordingly, dispensing of beverage medium from the cartridge 4 may be suitably timed to start during flow of precursor liquid into the mixing chamber 9, and end before the flow of precursor liquid into the mixing chamber stops. In this way, the beverage medium may mix with precursor liquid as it is dispensed from the cartridge 4, and once beverage medium dispensing is complete, precursor liquid may rinse the syrup chamber 96 and syrup chamber outlet 95, e.g., so that little or no beverage medium is present in the syrup chamber 96 once beverage dispensing is complete.

As can be seen in FIGS. 22-24, the component that defines the mixing chamber 9 may also include the outlet piercing element 39 that opens the outlet 48 of the cartridge. That is, the mixing chamber 9 may include an annular rim 91 that functions to contact a membrane at the cartridge outlet 48 and move into an annular groove of the cartridge 4 as the cartridge moves downwardly so that the outlet 48 is suitably opened for beverage medium dispensing. Moreover, the mixing chamber 9 may be removable from the dispensing station 29, e.g., for cleaning or replacement.

It should be understood that modifications to the illustrative embodiment above are possible. For example, the beverage medium could be driven from the cartridge 4 in other ways, such as by carbon dioxide gas pressure created by the cartridge 4, by gravity, by suction created by an adductor pump, venturi or other arrangement, etc., and the beverage medium may be dispensed directly into a user's cup where the precursor liquid 2 is also introduced. Rinsing of the mixing chamber 9 may or may not be necessary, e.g., to help prevent cross contamination between beverages. In some arrangements, the entire volume of beverage medium may be discharged into the mixing chamber, causing initial amounts of flavored precursor liquid 2 exiting the mixing chamber 9 to have a high beverage medium concentration. However, as the beverage medium is swept from the mixing chamber by the precursor liquid 2, the precursor liquid itself may effectively rinse the mixing chamber. In arrangements where the beverage medium is a dry material, such as a powder, some precursor liquid may be introduced into the cartridge to pre-wet the medium or otherwise improve an ability to mix the medium with precursor liquid 2. The wetted medium may be mixed with additional precursor liquid 2 in the cartridge, or the wetted medium may be expelled from the cartridge, e.g., by air pressure, a plunger, etc., to a mixing chamber or other location for additional mixing with precursor liquid 2. Liquid 2 may be introduced into a mixing chamber using multiple streams, e.g., to enhance a mixing rate using low flow speeds so as to reduce loss of dissolved gas.

Also, the mixing chamber 9 may take other suitable forms, e.g., may cause the precursor liquid 2 and beverage medium to move in a spiral, swirl or other fashion to enhance mixing, may have one or more motor driven blades, impellers or other elements to mix contents in the chamber 9, and so on. While the mixing chamber 9 may be separate from the cartridge 4, the mixing chamber 9 could be incorporated into a cartridge 4 if desired. The mixing chamber 9 may be cooled as well, e.g., by a refrigeration system, to help cool the beverage provided to the cup 8. In the case where the carbonated liquid 2 is not flavored or where the liquid 2 is mixed with the beverage medium before passing through the carbonation tank 6, the mixing chamber 9 may be eliminated or arranged to mix the precursor liquid 2 and beverage medium upstream of the tank 6. Alternately, the precursor liquid supply 10 may be arranged to mix the precursor liquid 2 with the beverage medium in the cartridge 4 prior to routing the liquid 2 to the tank 6.

EXAMPLE 1

The release properties of a carbon dioxide adsorbent were measured in the following way: 8×12 beads of sodium zeolite 13× (such as are commercially available from UOP MOLSIV Adsorbents) were obtained. The beads were placed in a ceramic dish and fired in a Vulcan D550 furnace manufactured by Ceramco. The temperature in the furnace containing the beads was raised to 550° C. at a rate of 3° C./min and was held at 550° C. for 5 hours for firing and preparation of the beads for charging with carbon dioxide.

The beads were removed from the furnace and immediately transferred to a metal container equipped with a tightly fitted lid and entrance and exit ports permitting circulation of gas. With the beads sealed in the container, the container was flooded with carbon dioxide gas and pressurized to 15 psig. (Note, however, that experiments have been performed between 5-32 psig.) The chamber was held at the set pressure for 1 hour. During this hold period the chamber was bled every 15 min. At the end of this period a quantity of gas had adsorbed to the beads.

A 30 g sample of charged 13× zeolite was measured, and a beaker filled with 250 ml of water at room temperature of 22° C. The beaker and water was placed on a balance and the balance zeroed. The 30 g of charged zeolite was then added to the beaker and the change in weight versus time was measured. It was shown that the change in weight became approximately steady after a period of 50 seconds, and that the beads lost about 4.2 g (14 wt %) of weight attributed to the release of carbon dioxide. Of course, some carbon dioxide may have been dissolved into the water.

| Time (sec) | Weight (grams) |
| --- | --- |
| 0 | 30 |
| 25 | 26.7 |
| 50 | 25.8 |
| 75 | 25.6 |
| 100 | 25.5 |

EXAMPLE 2

Charged zeolite 13× was prepared as in Example 1. A 30 g sample of the charged zeolites was then placed in metal chamber with a water inlet port at the bottom and a gas outlet port at the top. The chamber that held the zeolites was 34×34 mm in cross section and had 2 metal filter discs with 64 1/16" diameter holes to retain the zeolite material. Tap water was then flooded into the bottom of the chamber perpendicular to the cross-section at an average flow rate of 60 ml/min. Gas evolved through the top outlet port.

The pressure of the gas in the chamber was measured with a pressure gauge and controlled using a needle valve attached to the exit port of the gas chamber. The needle valve was set to maintain the chamber at a pressure of 35 psig by manually adjusting the valve over the course of exposing charged zeolites in the chamber to water. Once the valve was set to an operating pressure, the system would perform repeatably with zeolite samples charged in the same manner.

EXAMPLE 3

Charged zeolite 13× was prepared as in Example 1. A 30 g sample of the charged zeolites was then placed in a semi rigid 50 ml polystyrene-polyethylene-EVOH laminate cup container and thermally sealed with a foil lid. The sealed zeolite cartridges were then placed into a sealed, metal cartridge chamber and pierced on the top and bottom.

Tap water was introduced at the bottom of the cartridge with the flow controlled by a solenoid valve. The solenoid valve was actuated via a pressure switch connected to the top gas outlet of the cartridge chamber. During three different tests, the pressure switch was set to three different operating pressures of 5, 22, and 35 psig. The resulting gas at the set pressures was then introduced into the shellside of a hydrophobic membrane contactor (1×5.5 Minimodule from Liquicel, of Charlotte, N.C.). The other shellside port was plugged to prevent gas from escaping. Water from a reservoir containing 400 ml of water and approximately 50 g of ice was circulated from the reservoir, through the contactor, and back to the reservoir (e.g., like that shown in FIG. 2) using an Ulka (Milan, Italy) type EAX 5 vibratory pump through the lumenside of the membrane contactor. The pressure of the reservoir and contactor was maintained at the same pressure as the gas was produced. The system produced gas and circulated the water for approximately 60 seconds before being stopped.

The resulting carbonated water was then tested for carbonation levels using a CarboQC from Anton-Paar of Ashland, Va. The results for are shown in the table below:

| System Pressure (psig) | Average Carbonation Level (Volumes $CO_2$ dissolved) |
| --- | --- |
| 10 | 1.35 |
| 22 | 2.53 |
| 35 | 3.46 |

Thus, the gas was shown to evolve from the zeolites in the cartridges at a controllable rate (based on water delivery to the cartridge chamber) and then dissolved into water to produce a carbonated beverage. In addition, this illustrates the concept that by controlling system pressures one can control the level of carbonation of the finished beverage. It is expected that higher system pressures, e.g., of about 40-50 psi above ambient, would produce a 4 volume carbonated beverage (having a liquid volume of about 500 ml) in about 60 seconds or less.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for forming a beverage, comprising:
providing a beverage medium under pressure to a beverage medium chamber of a mixing chamber;
causing flow of a precursor liquid from a precursor liquid inlet of the mixing chamber to a dispense outlet of the mixing chamber;
causing flow of beverage medium under pressure from the beverage medium chamber to the dispense outlet via a chamber outlet while preventing flow of precursor liquid into the beverage medium chamber via a chamber inlet;
dispensing beverage medium and precursor liquid from the dispense outlet;
reducing a pressure in the beverage medium chamber to permit flow of precursor liquid into the beverage medium chamber via the chamber inlet; and
permitting precursor liquid that flows into the beverage medium chamber via the chamber inlet to exit the beverage medium chamber via the chamber outlet.

2. The method of claim 1, wherein the precursor liquid inlet and the dispense outlet are connected by a 90 degree elbow, the chamber inlet is positioned at an upstream end of the 90 degree elbow, and the chamber outlet is positioned at a downstream end of the 90 degree elbow.

3. The method of claim 2, wherein the chamber inlet and chamber outlet are positioned at a radially outer wall of the 90 degree elbow.

4. The method of claim 1, wherein the chamber outlet includes a plurality of channels that lead downwardly from the beverage medium chamber.

5. The method of claim 1, wherein the chamber inlet is oriented in a horizontal direction and the chamber outlet is arranged in a vertical direction.

6. The method of claim 1, wherein the step of providing beverage medium under pressure includes receiving beverage medium in a downward direction into the beverage medium chamber.

7. The method of claim 1, wherein the step of reducing a pressure in the beverage medium chamber to permit flow of precursor liquid into the beverage medium chamber rinses the beverage medium chamber.

8. A method for forming a beverage, comprising:
providing an alcoholic beverage medium to a beverage medium chamber of a mixing chamber;
causing flow of a precursor liquid from a precursor liquid inlet of the mixing chamber to a dispense outlet of the mixing chamber;
causing flow of alcoholic beverage medium under pressure from the beverage medium chamber to the dispense outlet via a chamber outlet while preventing flow of precursor liquid into the beverage medium chamber;
dispensing beverage medium and precursor liquid from the dispense outlet;
reducing a pressure in the beverage medium chamber to permit flow of precursor liquid into the beverage medium chamber via the chamber inlet; and
permitting precursor liquid that flows into the beverage medium chamber via the chamber inlet to exit the beverage medium chamber via the chamber outlet;
wherein the precursor liquid inlet and the dispense outlet are connected by a 90 degree elbow, the chamber inlet is positioned at an upstream end of the 90 degree elbow, and the chamber outlet is positioned at a downstream end of the 90 degree elbow.

9. The method of claim 8, wherein the chamber inlet and chamber outlet are positioned at a radially outer wall of the 90 degree elbow.

10. The method of claim 8, wherein the chamber outlet includes a plurality of channels that lead downwardly from the beverage medium chamber.

11. The method of claim 8, wherein the chamber inlet is oriented in a horizontal direction and the chamber outlet is arranged in a vertical direction.

12. The method of claim 8, wherein the step of providing beverage medium under pressure includes receiving beverage medium in a downward direction into the beverage medium chamber.

13. The method of claim 8, wherein the step of reducing a pressure in the beverage medium chamber to permit flow of precursor liquid into the beverage medium chamber rinses the beverage medium chamber.

14. A method for forming a beverage, comprising:
providing an alcoholic beverage medium to a beverage medium chamber of a mixing chamber;
causing flow of a precursor liquid from a precursor liquid inlet of the mixing chamber to a dispense outlet of the mixing chamber;
causing flow of alcoholic beverage medium under pressure from the beverage medium chamber to the dispense outlet via a chamber outlet;

dispensing beverage medium and precursor liquid from the dispense outlet;

reducing a pressure in the beverage medium chamber to permit flow of precursor liquid into the beverage medium chamber; and permitting precursor liquid that flows into the beverage medium chamber to exit the beverage medium chamber.

15. The method of claim 14, wherein the precursor liquid inlet and the dispense outlet are connected by a 90 degree elbow, the chamber inlet is positioned at an upstream end of the 90 degree elbow, and the chamber outlet is positioned at a downstream end of the 90 degree elbow.

16. The method of claim 14, wherein the chamber inlet and chamber outlet are positioned at a radially outer wall of the 90 degree elbow.

17. The method of claim 14, wherein the chamber outlet includes a plurality of channels that lead downwardly from the beverage medium chamber.

18. The method of claim 14, wherein the chamber inlet is oriented in a horizontal direction and the chamber outlet is arranged in a vertical direction.

19. The method of claim 14, wherein the step of providing beverage medium under pressure includes receiving beverage medium in a downward direction into the beverage medium chamber.

20. The method of claim 14, wherein the step of reducing a pressure in the beverage medium chamber to permit flow of precursor liquid into the beverage medium chamber rinses the beverage medium chamber.

\* \* \* \* \*